United States Patent
Wang et al.

(10) Patent No.: US 12,284,688 B2
(45) Date of Patent: Apr. 22, 2025

(54) USER EQUIPMENT AND METHOD FOR MSGA TRANSMISSION IN A TWO-STEP RA PROCEDURE

(71) Applicant: SHARP KABUSHIKI KAISHA, Sakai (JP)

(72) Inventors: Hai-Han Wang, Taipei (TW); Chia-Hung Wei, Taipei (TW)

(73) Assignee: SHARP KABUSHIKI KAISHA, Sakai (JP)

( * ) Notice: Subject to any disclaimer, the term of this patent is extended or adjusted under 35 U.S.C. 154(b) by 386 days.

(21) Appl. No.: 17/957,641

(22) Filed: Sep. 30, 2022

(65) Prior Publication Data

US 2023/0108510 A1 Apr. 6, 2023

Related U.S. Application Data

(60) Provisional application No. 63/251,504, filed on Oct. 1, 2021.

(51) Int. Cl.
H04W 74/0838 (2024.01)
H04W 74/08 (2009.01)
H04W 74/0833 (2024.01)

(52) U.S. Cl.
CPC ... H04W 74/0841 (2013.01); H04W 74/0866 (2013.01)

(58) Field of Classification Search
CPC ......... H04W 74/0841; H04W 74/0866; H04W 74/0838; H04W 74/0836; H04W 74/006;

(Continued)

(56) References Cited

U.S. PATENT DOCUMENTS

| | | | |
|---|---|---|---|
| 2022/0086915 A1* | 3/2022 | Canonne-Velasquez | H04W 74/0833 |
| 2022/0150982 A1* | 5/2022 | Lee | H04W 74/0833 |
| 2022/0210842 A1* | 6/2022 | Lei | H04L 5/0051 |

OTHER PUBLICATIONS

3GPP TS 37.213 V16.6.0 (Jun. 2021), 3rd Generation Partnership Project; Technical Specification Group Radio Access Network; Physical layer procedures for shared spectrum channel access (Release 16).

(Continued)

*Primary Examiner* — Thai Nguyen
(74) *Attorney, Agent, or Firm* — ScienBiziP, P.C.

(57) ABSTRACT

A method by a user equipment (UE) for Message A (MsgA) transmission in a two-step Random Access (RA) procedure is provided. The method includes receiving, from a base station (BS), a Physical Random Access Channel (PRACH) configuration including sets of PRACH preambles, each set of PRACH preambles being associated with a feature or feature combination; receiving, from the BS, a first MsgA Physical Uplink Shared Channel (PUSCH) configuration associated with the PRACH configuration; receiving, from the BS, a second MsgAPUSCH configuration associated with a specific set of PRACH preambles; determining a first PRACH preamble associated with a specific feature or feature combination from the sets of PRACH preambles; determining a MsgA PUSCH corresponding to the first PRACH preamble depending on whether the first PRACH preamble is within the specific set of PRACH preambles; and transmitting, to the BS, the first PRACH preamble and the MsgA PUSCH.

12 Claims, 9 Drawing Sheets

(58) Field of Classification Search
CPC ......... H04W 74/0833; H04W 72/0453; H04W 72/0446; H04L 5/0044; H04L 5/0094; H04L 5/0051
See application file for complete search history.

(56) References Cited

OTHER PUBLICATIONS

3GPP TS 38.214 V16.7.0 (Sep. 2021), 3rd Generation Partnership Project; Technical Specification Group Radio Access Network; NR; Physical layer procedures for data (Release 16).
3GPP TS 38.211 V16.7.0 (Sep. 2021), 3rd Generation Partnership Project; Technical Specification Group Radio Access Network; NR; Physical channels and modulation (Release 16).

* cited by examiner

FIG. 1A

| SSB2(1) | SSB2(2) | SSB2(3) | SSB2(4) | SSB2(5) | SSB2(6) | SSB2(7) | SSB2(8) |
| SSB1(1) | SSB1(2) | SSB1(3) | SSB1(4) | SSB1(5) | SSB1(6) | SSB1(7) | SSB1(8) |

| SSB1(2) | SSB2(2) | SSB1(4) | SSB2(4) | SSB1(6) | SSB2(6) | SSB1(8) | SSB2(8) |
| SSB1(1) | SSB2(1) | SSB1(3) | SSB2(3) | SSB1(5) | SSB2(5) | SSB1(7) | SSB2(7) |

100B

USER EQUIPMENT AND METHOD FOR MSGA TRANSMISSION IN A TWO-STEP RA PROCEDURE

CROSS-REFERENCE TO RELATED APPLICATION(S)

The present disclosure claims the benefit of and priority to U.S. Provisional Patent Application Ser. No. 63/251,504, filed on Oct. 1, 2021, entitled "PRACH RESOURCE CONFIGURATION FOR IDENTIFICATION OF REDCAP UE," the content of which is hereby incorporated fully by reference into the present disclosure for all purposes.

FIELD

The present disclosure is related to wireless communication and, more specifically, to a user equipment (UE) and method for Message A (MsgA) transmission in a two-step Random Access (RA) procedure in cellular wireless communication networks.

BACKGROUND

Various efforts have been made to improve different aspects of wireless communication for cellular wireless communication systems, such as $5^{th}$ Generation (5G) New Radio (NR), by improving data rate, latency, reliability, and mobility. The 5G NR system is designed to provide flexibility and configurability to optimize network services and types, accommodating various use cases, such as enhanced Mobile Broadband (eMBB), massive Machine-Type Communication (mMTC), and Ultra-Reliable and Low-Latency Communication (URLLC). However, as the demand for radio access continues to increase, there exists a need for further improvements in the art.

SUMMARY

The present disclosure is related to a UE and a method for MsgA transmission in a two-step RA procedure in cellular wireless communication networks.

In a first aspect of the present application, a method for MsgA transmission in a two-step RA procedure performed by a UE is provided. The method includes receiving, from a base station (BS), a Physical Random Access Channel (PRACH) configuration, the PRACH configuration including one or more sets of PRACH preambles, each set of PRACH preambles being associated with a feature or a feature combination; receiving, from the BS, a first MsgA Physical Uplink Shared Channel (PUSCH) configuration associated with the PRACH configuration; receiving, from the BS, a second MsgA PUSCH configuration associated with a specific set of PRACH preambles in the one or more sets of PRACH preambles; determining a first PRACH preamble from at least one of the one or more sets of PRACH preambles, the first PRACH preamble being associated with a specific feature or a specific feature combination; determining a MsgA PUSCH corresponding to the first PRACH preamble; and transmitting, to the BS, the first PRACH preamble and the MsgA PUSCH. The MsgA PUSCH is determined according to the first PRACH preamble and the first MsgAPUSCH configuration in a case that the first PRACH preamble is not within the specific set of PRACH preambles. The MsgA PUSCH is determined according to the first PRACH preamble and the second MsgA PUSCH configuration in a case that the first PRACH preamble is within the specific set of PRACH preambles.

In an implementation of the first aspect, the MsgA PUSCH is included in one or more MsgA PUSCH resources mapped to one or more PRACH preambles including the first PRACH preamble. Each of the one or more MsgA PUSCH resources includes a PUSCH occasion and a Demodulation Reference Signal (DMRS) resource associated with the PUSCH occasion. The PUSCH occasion is configured by the first MsgA PUSCH configuration or the second MsgA PUSCH configuration depending on whether the first PRACH preamble is within the specific set of PRACH preambles.

In another implementation of the first aspect, the DMRS resource includes a DMRS port and a DMRS sequence configured by the first MsgA PUSCH configuration or the second MsgA PUSCH configuration depending on whether the first PRACH preamble is within the specific set of PRACH preambles.

In another implementation of the first aspect, a number of PRACH preambles in the one or more PRACH preambles is equal to a number of PRACH preambles in one or more PRACH occasions in an association pattern period divided by a number of MsgA PUSCH resources associated with the one or more PRACH occasions in the association pattern period.

In another implementation of the first aspect, each of the one or more PRACH occasions is associated with one or more MsgAPUSCH occasions determined by a time domain offset, a number of slots, and a number of PUSCH occasions within a slot.

In another implementation of the first aspect, the first PRACH preamble is transmitted in a first PRACH occasion indicated by a PRACH mask index associated with the specific feature or the specific feature combination.

In a second aspect of the present application, a UE for performing MsgA transmission in a two-step RA procedure is provided. The UE includes one or more processors and at least one memory coupled to at least one of the one or more processors, the at least one memory storing computer-executable instructions that, when executed by the at least one of the one or more processors, cause the UE to receive, from a BS, a PRACH configuration, the PRACH configuration including one or more sets of PRACH preambles, each set of PRACH preambles being associated with a feature or a feature combination; receiving, from the BS, a first MsgA PUSCH configuration associated with the PRACH configuration; receiving, from the B S, a second MsgA PUSCH configuration associated with a specific set of PRACH preambles in the one or more sets of PRACH preambles; determining a first PRACH preamble from at least one of the one or more sets of PRACH preambles, the first PRACH preamble being associated with a specific feature or a specific feature combination; determining a MsgA PUSCH corresponding to the first PRACH preamble; and transmitting, to the BS, the first PRACH preamble and the MsgA PUSCH. The MsgA PUSCH is determined according to the first PRACH preamble and the first MsgA PUSCH configuration in a case that the first PRACH preamble is not within the specific set of PRACH preambles. The MsgA PUSCH is determined according to the first PRACH preamble and the second MsgA PUSCH configuration in a case that the first PRACH preamble is within the specific set of PRACH preambles.

BRIEF DESCRIPTION OF THE DRAWINGS

Aspects of the present disclosure are best understood from the following detailed disclosure when read with the accompanying drawings. Various features are not drawn to scale. Dimensions of various features may be arbitrarily increased or reduced for clarity of discussion.

FIG. 1A is a diagram illustrating mapping of PRACH occasions according to an example implementation of the present disclosure.

FIG. 1B is a diagram illustrating mapping of PRACH occasions according to another example implementation of the present disclosure.

DESCRIPTION

Figure 2:
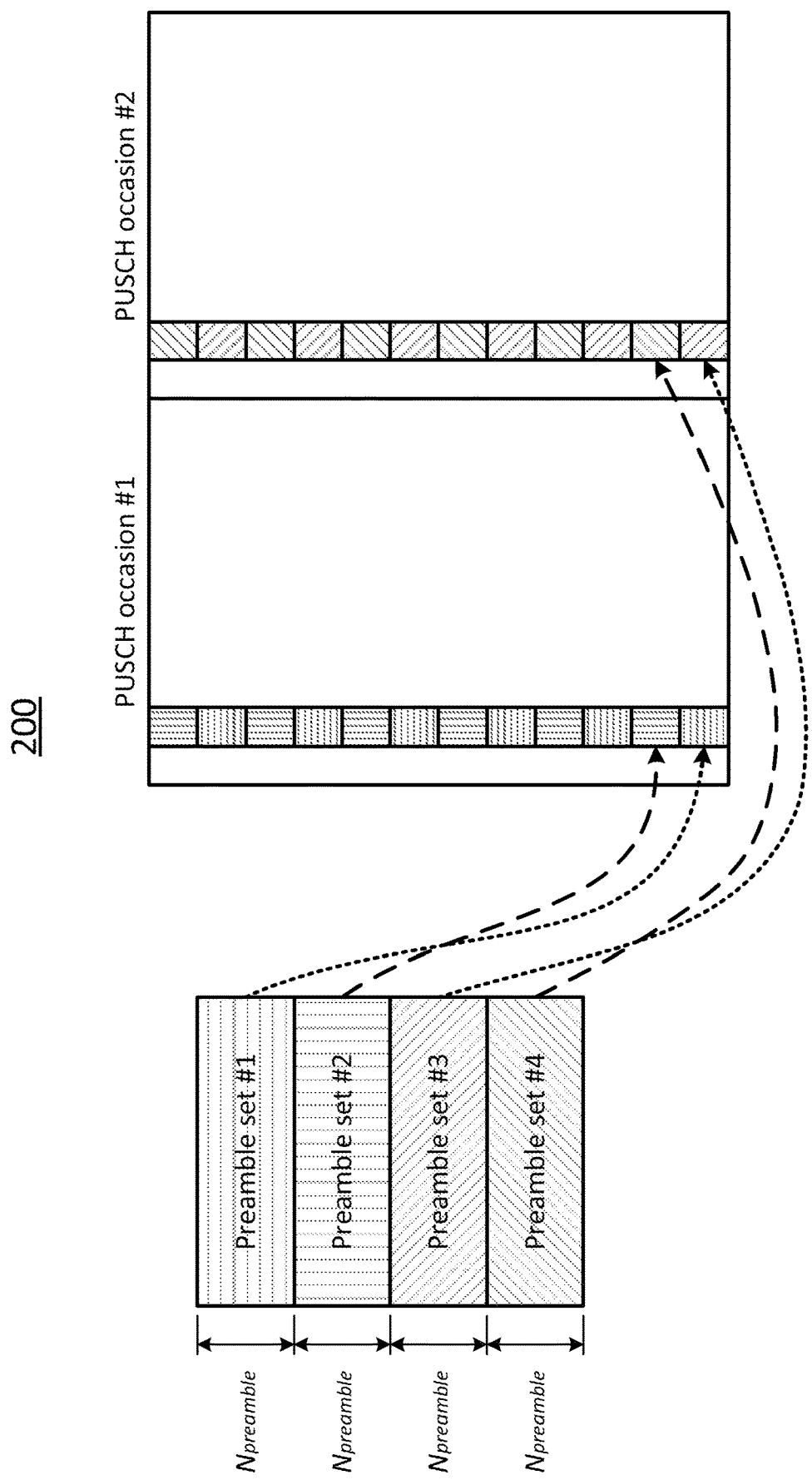
FIG. 2 is a diagram illustrating mapping of PRACH preambles for 2-step random access to MsgA PUSCH resources, according to an example implementation of the present disclosure.

Abbreviations used in this disclosure include:

| Abbreviation | Full name |
| --- | --- |
| 3GPP | 3$^{rd}$ Generation Partnership Project |
| 5G | 5$^{th}$ Generation |
| ACK | Acknowledgment |
| BS | Base Station |
| BW | Bandwidth |
| BWP | Bandwidth Part |
| CA | Carrier Aggregation |
| CCA | Clear Channel Assessment |
| CCE | Control Channel Elements |
| CE | Coverage Enhancement |
| CO | Channel Occupancy |
| CORESET | Control Resource Set |
| COT | Channel Occupancy Time |
| CP | Cyclic Prefix |
| DC | Dual Connectivity |
| DCI | Downlink Control Information |
| DL | Downlink |
| DL-SCH | Downlink Shared Channel |
| DMRS | Demodulation Reference Signal |
| E-UTRA | Evolved Universal Terrestrial Radio Access |
| FBE | Frame-Based Equipment |
| FDM | Frequency Division Multiplexing |
| FDMed | Frequency Division Multiplexed |
| FFP | Fixed Frame Period |

-continued

| Abbreviation | Full name |
| --- | --- |
| FR | Frequency Range |
| HARQ | Hybrid Automatic Repeat Request |
| HARQ-ACK | HARQ Acknowledgement |
| ID | Identifier |
| IE | Information Element |
| IoT | Internet of Things |
| LBT | Listen Before Talk |
| LTE | Long Term Evolution |
| MAC | Medium Access Control |
| MAC CE | MAC Control Element |
| MCG | Master Cell Group |
| MIB | Master Information Block |
| MN | Master Node |
| Msg | Message |
| NACK | Negative Acknowledgment |
| NR | New Radio |
| NW | Network |
| OFDM | Orthogonal Frequency Division Multiplexing |
| PCell | Primary Cell |
| PDCCH | Physical Downlink Control Channel |
| PDCP | Packet Data Convergence Protocol |
| PDSCH | Physical Downlink Shared Channel |
| PHY | Physical (layer) |
| PO | PUSCH Occasion |
| PRACH | Physical Random Access Channel |
| PRB | Physical Resource Block |
| PUCCH | Physical Uplink Control Channel |
| PUSCH | Physical Uplink Shared Channel |
| RA | Random Access |
| RACH | Random Access Channel |
| RAN | Radio Access Network |
| RAR | Random Access Response |
| RB | Resource Block |
| RedCap | Reduced Capability |
| RF | Radio Frequency |
| RLAN | Radio Local Area Network |
| RLC | Radio Link Control |
| RNTI | Radio Network Temporary Identifier |
| RO | RACH (or PRACH) Occasion |
| RRC | Radio Resource Control |
| RS | Reference Signal |
| SCell | Secondary Cell |
| SCG | Secondary Cell Group |
| SCS | Subcarrier Spacing |
| SDT | Small Data Transmission |
| SI | System Information |
| SIB | System Information Block |
| SIB1 | System Information Block Type 1 |
| SLIV | Start and Length Indicator Value |
| SN | Secondary Node |
| SR | Scheduling Request |
| SRB | Signaling Radio Bearer |
| SS | Synchronization Signal |
| SSB | Synchronization Signal Block |
| TA | Timing Advance |
| TB | Transport Block |
| TBS | Transport Block Size |
| TDD | Time Division Duplex |
| TS | Technical Specification |
| UE | User Equipment |
| UL | Uplink |

The following contains specific information related to implementations of the present disclosure. The drawings and their accompanying detailed disclosure are merely directed to implementations. However, the present disclosure is not limited to these implementations. Other variations and implementations of the present disclosure will be obvious to those skilled in the art.

Unless noted otherwise, like or corresponding elements among the drawings may be indicated by like or corresponding reference numerals. Moreover, the drawings and illustrations in the present disclosure are generally not to scale and are not intended to correspond to actual relative dimensions.

For consistency and ease of understanding, like features may be identified (although, in some examples, not illustrated) by the same numerals in the drawings. However, the features in different implementations may be different in other respects and shall not be narrowly confined to what is illustrated in the drawings.

References to "one implementation," "an implementation," "example implementation," "various implementations," "some implementations," "implementations of the present application," etc., may indicate that the implementation(s) of the present application so described may include a particular feature, structure, or characteristic, but not every possible implementation of the present application necessarily includes the particular feature, structure, or characteristic. Further, repeated use of the phrase "in one implementation," or "in an example implementation," "an implementation," do not necessarily refer to the same implementation, although they may. Moreover, any use of phrases like "implementations" in connection with "the present application" are never meant to characterize that all implementations of the present application must include the particular feature, structure, or characteristic, and should instead be understood to mean "at least some implementations of the present application" includes the stated particular feature, structure, or characteristic. The term "coupled" is defined as connected, whether directly or indirectly through intervening components, and is not necessarily limited to physical connections. The term "comprising," when utilized, means "including, but not necessarily limited to"; it specifically indicates open-ended inclusion or membership in the so-described combination, group, series, and the equivalent.

The expression "at least one of A, B and C" or "at least one of the following: A, B and C" means "only A, or only B, or only C, or any combination of A, B and C." The terms "system" and "network" may be used interchangeably. The term "and/or" is only an association relationship for describing associated objects and represents that three relationships may exist such that A and/or B may indicate that A exists alone, A and B exist at the same time, or B exists alone. The character "/" generally represents that the associated objects are in an "or" relationship.

For the purposes of explanation and non-limitation, specific details, such as functional entities, techniques, protocols, and standards, are set forth for providing an understanding of the disclosed technology. In other examples, detailed disclosure of well-known methods, technologies, systems, and architectures are omitted so as not to obscure the present disclosure with unnecessary details.

Persons skilled in the art will immediately recognize that any network function(s) or algorithm(s) disclosed may be implemented by hardware, software, or a combination of software and hardware. Disclosed functions may correspond to modules which may be software, hardware, firmware, or any combination thereof.

A software implementation may include computer executable instructions stored on a computer-readable medium, such as memory or other type of storage devices. One or more microprocessors or general-purpose computers with communication processing capability may be programmed with corresponding executable instructions and perform the disclosed network function(s) or algorithm(s).

The microprocessors or general-purpose computers may include Application-Specific Integrated Circuits (ASICs), programmable logic arrays, and/or one or more Digital Signal Processor (DSPs). Although some of the disclosed implementations are oriented to software installed and executing on computer hardware, alternative implementations implemented as firmware, as hardware, or as a combination of hardware and software are well within the scope of the present disclosure. The computer-readable medium includes but is not limited to Random Access Memory (RAM), Read Only Memory (ROM), Erasable Programmable Read-Only Memory (EPROM), Electrically Erasable Programmable Read-Only Memory (EEPROM), flash memory, Compact Disc Read-Only Memory (CD-ROM), magnetic cassettes, magnetic tape, magnetic disk storage, or any other equivalent medium capable of storing computer-readable instructions.

A radio communication network architecture such as a Long-Term Evolution (LTE) system, an LTE-Advanced (LTE-A) system, an LTE-Advanced Pro system, or a 5G NR Radio Access Network (RAN) typically includes at least one base station (BS), at least one UE, and one or more optional network elements that provide connection within a network. The UE communicates with the network such as a Core Network (CN), an Evolved Packet Core (EPC) network, an Evolved Universal Terrestrial RAN (E-UTRAN), a 5G Core (5GC), or an internet via a RAN established by one or more BSs.

A UE may include, but is not limited to, a mobile station, a mobile terminal or device, or a user communication radio terminal. The UE may be a portable radio equipment that includes, but is not limited to, a mobile phone, a tablet, a wearable device, a sensor, a vehicle, or a Personal Digital Assistant (PDA) with wireless communication capability. The UE is configured to receive and transmit signals over an air interface to one or more cells in a RAN.

The BS may be configured to provide communication services according to at least a Radio Access Technology (RAT) such as Worldwide Interoperability for Microwave Access (WiMAX), Global System for Mobile communications (GSM) that is often referred to as 2G, GSM Enhanced Data rates for GSM Evolution (EDGE) RAN (GERAN), General Packet Radio Service (GPRS), Universal Mobile Telecommunication System (UMTS) that is often referred to as 3G based on basic wideband-code division multiple access (W-CDMA), high-speed packet access (HSPA), LTE, LTE-A, evolved LTE (eLTE) that is LTE connected to 5GC, NR (often referred to as 5G), and/or LTE-A Pro. However, the scope of the present disclosure is not limited to these protocols.

The BS may include, but is not limited to, a node B (NB) in the UMTS, an evolved node B (eNB) in LTE or LTE-A, a radio network controller (RNC) in UMTS, a BS controller (BSC) in the GSM/GERAN, an ng-eNB in an Evolved Universal Terrestrial Radio Access (E-UTRA) BS in connection with 5GC, a next generation Node B (gNB) in the 5G-RAN, or any other apparatus capable of controlling radio communication and managing radio resources within a cell. The BS may serve one or more UEs via a radio interface.

The BS is operable to provide radio coverage to a specific geographical area using a plurality of cells forming the RAN. The BS supports the operations of the cells. Each cell is operable to provide services to at least one UE within its radio coverage.

Each cell (often referred to as a serving cell) provides services to serve one or more UEs within its radio coverage such that each cell schedules the DL and optionally UL resources to at least one UE within its radio coverage for DL and optionally UL packet transmissions. The BS may communicate with one or more UEs in the radio communication system via the plurality of cells.

A cell may allocate sidelink (SL) resources for supporting Proximity Service (ProSe) or Vehicle to Everything (V2X) service. Each cell may have overlapped coverage areas with other cells.

In Multi-RAT Dual Connectivity (MR-DC) cases, the primary cell of a Master Cell Group (MCG) or a Secondary Cell Group (SCG) may be called a Special Cell (SpCell). A Primary Cell (PCell) may refer to the SpCell of an MCG. A Primary SCG Cell (PSCell) may refer to the SpCell of an SCG. MCG may refer to a group of serving cells associated with the Master Node (MN), including the SpCell and optionally one or more Secondary Cells (SCells). An SCG may refer to a group of serving cells associated with the Secondary Node (SN), including the SpCell and optionally one or more SCells.

As previously disclosed, the frame structure for NR supports flexible configurations for accommodating various next generation (e.g., 5G) communication requirements, such as Enhanced Mobile Broadband (eMBB), Massive Machine Type Communication (mMTC), and Ultra-Reliable and Low-Latency Communication (URLLC), while fulfilling high reliability, high data rate, and low latency requirements. The Orthogonal Frequency-Division Multiplexing (OFDM) technology in the 3GPP may serve as a baseline for an NR waveform. The scalable OFDM numerology, such as adaptive sub-carrier spacing, channel bandwidth, and Cyclic Prefix (CP), may also be used.

Two coding schemes are considered for NR, specifically Low-Density Parity-Check (LDPC) code and Polar Code. The coding scheme adaption may be configured based on channel conditions and/or service applications.

At least DL transmission data, a guard period, and a UL transmission data should be included in a transmission time interval (TTI) of a single NR frame. The respective portions of the DL transmission data, the guard period, and the UL transmission data should also be configurable based on, for example, the network dynamics of NR. SL resources may also be provided in an NR frame to support ProSe services or V2X services.

Examples of some selected terms are provided as follows.

Bandwidth Part (BWP): A subset of the total cell bandwidth of a cell is referred to as a BWP, and bandwidth adaptation (BA) is achieved by configuring the UE with BWP(s) and telling the UE which of the configured BWPs is currently the active one. To enable BA on the PCell, the gNB configures the UE with UL and DL BWP(s). To enable BA on SCells in case of CA, the gNB configures the UE with DL BWP(s) at least (e.g., there may be none in the UL). For the PCell, the initial BWP is the BWP used for initial access. For the SCell(s), the initial BWP is the BWP configured for the UE to first operate at SCell activation. UE may be configured with a first active uplink BWP by a firstActiveUplinkBWP IE. If the first active uplink BWP is configured for an SpCell, the firstActiveUplinkBWP IE field contains the ID of the UL BWP to be activated upon performing the RRC (re-)configuration. If the field is absent, the RRC (re-) configuration does not impose a BWP switch. If the first active uplink BWP is configured for an SCell, the firstActiveUplinkBWP IE field contains the ID of the UL BWP to be used upon MAC-activation of an SCell.

Frame-Based Equipment (FBE): Frame Based Equipment shall implement a Listen Before Talk (LBT)-based Channel Access Mechanism to detect the presence of other RLAN transmissions on an Operating Channel. Frame Based Equipment is equipment where the transmit/receive structure has a periodic timing with a periodicity equal to the Fixed Frame Period (FFP). FBE operation is also referred as semi-static channel access.

Clear Channel Assessment (CCA): Mechanism used by an equipment to identify other transmissions in the channel.

Channel Occupancy Time (COT): The total time for which gNB/UE and any gNB/UE(s) sharing the channel occupancy perform transmission(s) on a channel after a gNB/UE performs the corresponding channel access procedures.

Fixed Frame Period (FFP): The transmit/receive frame structure for FBE operation is with periodic occurrence of fixed frame periods (FFP). A FFP includes a COT and an idle period.

In the 3GPP Rel-15 and Rel-16 NR, eMBB and URLLC are the targeted use cases. It is identified that some identified IoT use cases, such as wearable devices, wireless sensor network, and video surveillance, may have requirements of lower reliability and longer latency compared to URLLC and lower data rate requirement compared to eMBB. The relaxed requirements may be fulfilled by the current specification. However, more challenging requirements, such as longer battery time and lower device complexity, may not be easily supported by the current specification. Specification impact is expected if the requirements are to be fulfilled. Specifically, if a reduced capability (RedCap) UE for supporting the newly identified use case may only support a maximum channel bandwidth of 20 MHz, the RedCap UE may not be able to transmit a Msg3 PUSCH if the bandwidth of the initial UL BWP is configured to be larger than 20 MHz. It is envisaged that the identified use cases may need to be supported in the same network as eMBB and URLLC. Therefore, coexistence of RedCap NR UEs and legacy NR UEs in the same carrier needs to be considered when the technical specification is developed.

A synchronization signal block (SSB) is used by a UE for measurement of the signal strength of a cell. The SSB carries a MIB, which includes configuration of CORESET 0 and search space 0 that are used for scheduling a SIB1. The SIB1 carries configurations related to cell selection and initial access, e.g., PRACH resource configuration. The UE may evaluate the measured results based on the configurations in the SIB1 to determine whether to camp on the cell and perform initial access. During initial access, an initial DL BWP is defined as the PRBs containing CORESET 0. The initial DL BWP is used for receiving RACH procedure related DL messages, e.g., RAR, Msg4, and other messages before a dedicated DL BWP is configured by a gNB. The initial DL BWP is also used for receiving system information and paging messages. To be specific, a Type-1 common search space may be configured by the SIB1 to be associated with CORESET 0 or a CORESET configured by commonControlResourceSet for receiving DCI that schedules RAR, Msg4, and other messages before a dedicated DL BWP is configured by the gNB. A Type-2 common search space may be configured by the SIB1 to be associated with CORESET 0 or a CORESET configured by commonControlResourceSet for receiving DCI that schedules paging messages. After initial access, the initial DL BWP may be defined as the PRBs configured by initial DL BWP configuration carried in the SIB1, if configured. Otherwise, the initial DL BWP is the same as that used during initial access.

On the other hand, during and after initial access, the initial UL BWP may be defined as the PRBs configured by initial UL BWP configuration carried in the SIB1.

To support a RedCap UE with the maximum UL bandwidth of 20 MHz, a gNB needs to schedule Msg3 PUSCH with a bandwidth less than 20 MHz. However, the constraint may affect the TBS or the code rate of Msg3 PUSCH, which may have an impact on the legacy NR UEs. Therefore, methods for identification of RedCap UEs before Msg3 PUSCH may need to be introduced such that the gNB may only need to schedule Msg3 PUSCH transmitted by RedCap UEs with a bandwidth less than 20 MHz.

In Rel-15, PRACH resources for initial access are configured by SIB1. Specifically, initial UL BWP configuration provided by the SIB1 includes BWP-UplinkCommon, which includes RACH-ConfigCommon that is used for configuring PRACH resources. Table 1 illustrates an example data structure of BWP-UplinkCommon. For RRC-connected UEs, PRACH resources may also be configured in other UL BWPs, and the UE may use the PRACH resources when the UL BWP with PRACH resources is the active UL BWP.

may be determined implicitly as the number of preambles mapped to an SSB in a RO minus the number of preambles of group A mapped to an SSB in a RO. It is noted that the preamble indexes of preambles of group A are lower than the preamble indexes of preambles of group B, and the lowest preamble index of the preamble indexes of group B may be equal to the highest preamble index of the preambles indexes of group A plus 1. In Rel-15, the number of preambles mapped to an SSB in a RO for contention-free 4-step random access may be determined as $N_{preamble}^{total}/N$ minus $N_{preamble,SSB}^{CB}$ where N is the number of SSBs mapped to a RO, $N_{preamble}^{total}$ preamble is the value provided by totalNumberOfRA-Preambles, and $N_{preamble,SSB}^{CB}$ is the value provided by CB-PreamblesPerSSB. In Rel-16, the preambles for contention-free 4-step random access for Rel-15 UEs may be configured as preambles for contention-based and contention-free 2-step random access. It is noted

TABLE 1

```
BWP-UplinkCommon ::=            SEQUENCE{
    genericParameters           BWP,
    rach-ConfigCommon               SetupRelease { RACH-ConfigCommon }
OPTIONAL,    -- Need M
    pusch-ConfigCommon              SetupRelease { PUSCH-ConfigCommon }
OPTIONAL,    -- Need M
    pucch-ConfigCommon              SetupRelease { PUCCH-ConfigCommon }
OPTIONAL,    -- Need M
    ...,                            SetupRelease { RACH-ConfigCommon }
    rach-ConfigCommonIAB-r16
OPTIONAL,    -- Need M
    useInterlacePUCCH-PUSCH-r16                 ENUMERATED   {enabled}
OPTIONAL,    -- Need R
    msgA-ConfigCommon-r16           SetupRelease { MsgA-ConfigCommon-r16 }
OPTIONAL     -- Cond SpCellOnly2
}
```

RACH-ConfigCommon may include IEs disclosed below. rach-ConfigGeneric may include configuration of time and frequency resources of PRACH. totalNumberOfRA-Preambles may be used to configure the total number of preambles used for contention-based and contention-free 4-step or 2-step random access in the PRACH resources defined in RACH-ConfigCommon. ssb-perRACH-OccasionAndCB-PreamblesPerSSB may define two parameters, including ssb-perRACH-Occasion and CB-PreamblesPerSSB. ssb-perRACH-Occasion may be used to configure the mapping ratio of SSB-to-PRACH occasion (SSB-to-RO) mapping. When the value configured by ssb-perRACH-Occasion is smaller than one, e.g., 1/N, an SSB is mapped to N consecutive PRACH occasions (ROs). On the other hand, when the value configured by ssb-perRACH-Occasion is larger than one, e.g., N, N SSBs are mapped to one RO. CB-PreamblesPerSSB may be used to configure the number of preambles mapped to an SSB in a RO for contention-based 4-step random access. The preambles may be divided into two groups of preambles, including group A and group B. The two groups of preambles may be used to differentiate the TBS of Msg3 PUSCH. When the TBS of Msg3 PUSCH is greater than a value configured by ra-Msg3SizeGroupA, the UE may select a preamble from group B so that the gNB may allocate a larger TBS for Msg3 PUSCH upon detection of the preamble from group B. groupBconfigured includes ra-Msg3SizeGroupA and numberOfRA-PreamblesGroupA, where numberOfRA-PreamblesGroupA may be used to configure the number of preambles of group A mapped to an SSB in a RO for contention-based 4-step random access. In other words, the number of preambles of group B mapped to an SSB in a RO for contention-based 4-step random access that the gNB should ensure a preamble allocated to a Rel-15 UE for contention-free 4-step random access is not selected from the preambles configured for contention-based and contention-free 2-step random access for Rel-16 UEs.

For SSB-to-RO mapping, SSB indexes provided by ssb-PositionsInBurst in the SIB1 or in ServingCellConfigCommon are mapped to valid PRACH occasions in the following order:

First, in increasing order of preamble indexes within a single PRACH occasion.
Second, in increasing order of frequency resource indexes for frequency-multiplexed PRACH occasions.
Third, in increasing order of time resource indexes for time-multiplexed PRACH occasions within a PRACH slot.
Fourth, in increasing order of indexes for PRACH slots.

Table 2 illustrates example mapping between a PRACH configuration period and an association period.

TABLE 2

| PRACH configuration period (msec) | Association period (the number of PRACH configuration periods) |
| --- | --- |
| 10 | {1, 2, 4, 8, 16} |
| 20 | {1, 2, 4, 8} |
| 40 | {1, 2, 4} |
| 80 | {1, 2} |
| 160 | {1} |

An association period, starting from frame 0, for mapping SSB indexes to PRACH occasions is the smallest value in the set determined by the PRACH configuration period according to Table 2 such that $N_{Tx}^{SSB}$ SSB indexes are mapped at least once to the PRACH occasions within the association period, where a UE obtains $N_{Tx}^{SSB}$ from the value of ssb-PositionsInBurst in the SIB1 or in ServingCell-ConfigCommon. If, after an integer number of SSB indexes to PRACH occasions mapping cycles within the association period, there is a set of PRACH occasions or PRACH preambles that are not mapped to $N_{Tx}^{SSB}$ SSB indexes, no SSB indexes are mapped to the set of PRACH occasions or PRACH preambles. An association pattern period includes one or more association periods and is determined so that a pattern between PRACH occasions and SSB indexes repeats at most every 160 msec. PRACH occasions not associated with SSB indexes after an integer number of association periods, if any, are not used for PRACH transmissions.

A PRACH mask index may be configured by RRC signaling, e.g., a handover command, or indicated by a PDCCH order. The PRACH mask index indicates the PRACH occasions that may be selected for the random access procedure triggered by the RRC signaling or the PDCCH order. The PRACH occasions are mapped consecutively per corresponding SSB index. The indexing of the PRACH occasion indicated by the PRACH mask index value is reset per mapping cycle of consecutive PRACH occasions per SSB index. The UE selects for a PRACH transmission the PRACH occasion indicated by the PRACH mask index value for the indicated SSB index in the first available mapping cycle. Table 3 illustrates PRACH occasions indicated by the PRACH mask indexes according to an example implementation of the present disclosure.

TABLE 3

| PRACH Mask Index/ msgA-SSB-SharedRO-Maskindex | Allowed PRACH occasion(s) of SSB |
| --- | --- |
| 0 | All |
| 1 | PRACH occasion index 1 |
| 2 | PRACH occasion index 2 |
| 3 | PRACH occasion index 3 |
| 4 | PRACH occasion index 4 |
| 5 | PRACH occasion index 5 |
| 6 | PRACH occasion index 6 |
| 7 | PRACH occasion index 7 |
| 8 | PRACH occasion index 8 |
| 9 | Every even PRACH occasion |
| 10 | Every odd PRACH occasion |
| 11 | Reserved |
| 12 | Reserved |
| 13 | Reserved |
| 14 | Reserved |
| 15 | Reserved |

FIG. 1A is a diagram 100A illustrating mapping of PRACH occasions according to an example implementation of the present disclosure. It is assumed that the value indicated by ssb-perRACH-Occasion is 1, there are 2 FDMed PRACH occasions, and two SSBs are transmitted. The values in the parentheses are the PRACH occasion indexes. One mapping cycle is shown in FIG. 1A.

FIG. 1B is a diagram 100B illustrating mapping of PRACH occasions according to another example implementation of the present disclosure. It is assumed that the value indicated by ssb-perRACH-Occasion is ½, there are 2 FDMed PRACH occasions, and two SSBs are transmitted. The values in the parentheses are the PRACH occasion indexes. One mapping cycle is shown in the FIG. 1B.

Table 4 illustrates an example data structure of RACH-ConfigCommon.

TABLE 4

```
RACH-ConfigCommon ::=                           SEQUENCE {
    rach-ConfigGeneric                          RACH-ConfigGeneric,
    totalNumberOfRA-Preambles                                           INTEGER     (1..63)
OPTIONAL,   -- Need S
    ssb-perRACH-OccasionAndCB-PreamblesPerSSB   CHOICE {
        oneEighth                                                       ENUMERATED
{n4,n8,n12,n16,n20,n24,n28,n32,n36,n40,n44,n48,n52,n56,n60,n64},
        oneFourth                                                       ENUMERATED
{n4,n8,n12,n16,n20,n24,n28,n32,n36,n40,n44,n48,n52,n56,n60,n64},
        oneHalf                                                         ENUMERATED
{n4,n8,n12,n16,n20,n24,n28,n32,n36,n40,n44,n48,n52,n56,n60,n64},
        one                                                             ENUMERATED
{n4,n8,n12,n16,n20,n24,n28,n32,n36,n40,n44,n48,n52,n56,n60,n64},
        two                                                             ENUMERATED
{n4,n8,n12,n16,n20,n24,n28,n32},
        four                                         INTEGER (1..16),
        eight                                        INTEGER (1..8),
        sixteen                                      INTEGER (1..4)
    }
OPTIONAL,   -- Need M
    groupBconfigured                            SEQUENCE {
        ra-Msg3SizeGroupA                           ENUMERATED {b56, 6144, b208, b256,
b282, b480, b640,
                                                                      b800, b1000, b72, spare6,
spare5, spare4, spare3, spare2, spare1},
        messagePowerOffsetGroupB                    ENUMERATED { minusinfinity, dB0, dB5,
dB8, dB10, dB12, dB15, dB18},
        numberOfRA-PreamblesGroupA                  INTEGER (1..64)
    }
OPTIONAL,   -- Need R
```

RACH-ConfigGeneric includes prach-ConfigurationIndex and msg1-FDM. Table 5 illustrates an example data structure of RACH-ConfigGeneric. prach-ConfigurationIndex is used to indicate an index to a table for PRACH configurations. The PRACH configurations may include the preamble format, the periodicity of PRACH resource, the slot index or subframe index corresponding to the slot or subframe in which there is a PRACH resource, the number of PRACH slots within a (PUSCH) slot or within a subframe, the number of PRACH occasions within a PRACH slot, the starting symbol PRACH occasions within a PRACH slot and the duration of a PRACH occasion. msg1-FDM is used to configure the number of FDMed ROs, denoted as F. For each RO configured by prach-ConfigurationIndex, there may be F-1 other ROs that are FDMed. The FDMed ROs are consecutive in frequency domain. msg1-FrequencyStart is used to indicate the starting PRB of the first RO among the F FDMed ROs, where the first RO is the lowest in frequency domain.

start of a next channel occupancy time where the UE does not transmit as specified in 3GPP TS 37.213 V16.6.0.

the candidate SSB index of the SSB corresponds to the SSB index provided by ssb-PositionsInBurst in SIB1 or in ServingCellConfigCommon.

If a UE is provided with tdd-UL-DL-ConfigurationCommon, a PRACH occasion in a PRACH slot is valid if the PRACH occasion is within UL symbols, or the PRACH occasion does not precede an SSB in the PRACH slot and starts at least $N_{gap}$ symbols after a last downlink symbol and at least $N_{gap}$ symbols after a last SSB symbol, where $N_{gap}$ is provided in Table 6, and if channelAccessMode=semistatic is provided, does not overlap with a set of consecutive symbols before the start of a next channel occupancy time where there shall not be any transmissions, as specified in 3GPP TS 37.213 V16.6.0.

TABLE 5

| | |
|---|---|
| RACH-ConfigGeneric ::= | SEQUENCE{ |
| prach-C onfigurati onindex | INTEGER (0..255), |
| msg1-FDM | ENUMERATED {one, two, four, eight}, |
| msg1-Frequency Start | INTEGER (0..maxNrofPhysicalResourceBlocks-1), |
| zeroCorrelationZoneConfig | INTEGER(0..15), |
| preambleReceivedTargetPower | INTEGER (−202..−60), |
| preambleTransMax | ENUMERATED {n3, n4, n5, n6, n7, n8, n10, n20, n50, n100, n200}, |
| powerRampingStep | ENUMERATED {dB0, dB2, dB4, dB6}, |
| ra-ResponseWindow | ENUMERATED {sl1, sl2, sl4, sl8, sl10, sl20, sl40, sl80}, |
| ..., | |
| prach-ConfigurationPeriodScaling-IAB-r16 {scf1, scf2, scf4, scf8, scf 16, scf3 2, scf64} | ENUMERATED OPTIONAL, -- Need R |
| prach-ConfigurationFrameOffset-IAB-r16 OPTIONAL, -- Need R | INTEGER (0..63) |
| prach-ConfigurationSOffset-1AB-r16 OPTIONAL, -- Need R | INTEGER (0..39) |
| ra-ResponseWindow-v1610 OPTIONAL, -- Need R | ENUMERATED { sl60, sl160} |
| prach-ConfigurationIndex-v1610 OPTIONAL -- Need R | INTEGER (256..262) |
| } | |

Table 6 illustrates $N_{gap}$ values for different preamble SCS μ.

TABLE 6

| Preamble SCS | $N_{gap}$ |
|---|---|
| 1.25 kHz or 5 kHz | 0 |
| 15 kHz, 30 kHz, 60 kHz, or 120 kHz | 2 |

For paired spectrum or supplementary uplink band, all PRACH occasions indicated by prach-ConfigurationIndex are valid.

For unpaired spectrum, PRACH occasions indicated by prach-ConfigurationIndex are subject to validation based on the following rules:

If a UE is not provided with tdd-UL-DL-ConfigurationCommon, a PRACH occasion in a PRACH slot is valid if it does not precede an SSB in the PRACH slot and starts at least $N_{gap}$ symbols after a last SSB reception symbol, where $N_{gap}$ is provided in Table 6 and, if channelAccessMode=semistatic is provided, does not overlap with a set of consecutive symbols before the the candidate SSB index of the SSB corresponds to the SSB index provided by ssb-PositionsInBurst in SIB1 or in ServingCellConfigCommon.

In Rel-16, 2-step random access is introduced. For 2-step random access, a PRACH preamble transmission is followed by a MsgA PUSCH transmission, where the MsgA PUSCH is preconfigured. The MsgA PUSCH in 2-step random access may include contents that would normally be included in a Msg3 PUSCH transmission in 4-step random access. The PRACH resources for 2-step random access may be shared with the PRACH resources for 4-step random access. Alternatively, the PRACH resources for 2-step random access may be separate from the PRACH resources for 4-step random access.

BWP-UplinkCommon includes msgA-ConfigCommon-r16 that is used to configure PRACH resources and MsgA PUSCH resources. Similar to 4-step random access, BWP-UplinkCommon for initial UL BWP and other BWPs may include msgA-ConfigCommon-r16. msgA-ConfigCommon-r16 may include rach-ConfigCommonTwoStepRA-r16 and msgA-PUSCH-Config-r16, where rach-ConfigCommonTwoStepRA-r16 and msgA-PUSCH-Config-r16 are used to configure the PRACH resources and MsgA PUSCH resources, respectively. rach-ConfigCommonTwoStepRAr16 may include similar configurations as those included in rach-ConfigCommon. Some of the configurations in rach-ConfigCommonTwoStepRA-r16 may only be present when the ROs for 2-step random access are separate from the ROs for 4-step random access. When configurations are absent in rach-ConfigCommonTwoStepRA-r16, the corresponding configurations in rach-ConfigCommon are applied for the PRACH resources for 2-step random access. For example, when ROs for 2-step random access and ROs for 4-step random access are separately configured, the parameter msgA-SSB-PerRACH-OccasionAndCB-PreamblesPerSSB configures the number of SSBs mapped to a RO and the number of contention-based preambles for each SSB for contention-based 2-step random access. If this parameter is not configured, the corresponding 4-step random access parameter (e.g., SSB-PerRACH-OccasionAndCB-PreamblesPerSSB) may be used for 2-step RACH. On the other hand, when ROs for 2-step random access and ROs for 4-step random access are shared, the number of contention-based preambles for an SSB in a RO for 2-step random access is configured by msgA-CB-PreamblesPerSSB-PerSharedRO. It is noted that the value configured by msgA-CB-PreamblesPerSSB-PerSharedRO should not exceed the number of preambles per SSB minus the number of contention-based preambles per SSB for 4-step random access, since the preambles that may be configured for 2-step random access for an SSB are the preambles regarded by Rel-15 UEs as contention-free preambles for 4-step random access for the SSB. It is noted that the preamble with the lowest preamble index configured for 2-step random access for an SSB is the preamble with the lowest preamble index for the SSB regarded by Rel-15 UEs as a contention-free preamble for 4-step random access.

Similar to 4-step random access, the preambles for 2-step random access may be divided into two groups of preambles, including group A and group B. When two groups of preambles are configured, two MsgA PUSCH configurations may be provided by msgA-PUSCH-ResourceGroupA-r16 and msgA-PUSCH-ResourceGroupB-r16, each corresponding to one group of preambles. Otherwise, when grouping of preambles is not configured, only one MsgA PUSCH configuration may be provided by msgA-PUSCH-ResourceGroupA-r16.

The two groups of preambles are used to differentiate the TBS of MsgA PUSCH. When the TBS of MsgA PUSCH is greater than a value configured by ra-MsgASizeGroupA, the UE may select a preamble from group B. In this case, the UE may use the MsgA PUSCH resource configured by msgA-PUSCH-ResourceGroupB-r16 for transmission of MsgA. Otherwise, when the UE selects a preamble from group A, the UE may use the MsgA PUSCH resource configured by msgA-PUSCH-ResourceGroupA-r16 for transmission of MsgA. groupBconfigured includes ra-MsgASizeGroupA and numberOfRA-PreamblesGroupA, where numberOfRA-PreamblesGroupA is used to configure the number of preambles of group A mapped to an SSB in a RO for contention-based 2-step random access. In other words, the number of preambles of group B mapped to an SSB in a RO for contention-based 2-step random access may be determined implicitly as the number of preambles mapped to an SSB in a RO for contention-based 2-step random access minus the number of preambles of group A mapped to an SSB in a RO for contention-based 2-step random access. It is noted that the preamble indexes of preambles of group A are lower than the preamble indexes of preambles of group B, and the lowest preamble index of the preamble indexes of group B may be equal to the highest preamble index of the preamble indexes of group A plus 1.

When ROs for 2-step random access and ROs for 4-step random access are shared, the PRACH transmission may be on a subset of PRACH occasions associated with a same SSB index within an SSB-to-RO mapping cycle if a PRACH mask index configured by msgA-SSB-SharedRO-MaskIndex is provided.

Table 7 illustrates an example data structure of a MsgA configuration.

TABLE 7

```
MsgA-ConfigCommon-r16 ::=                SEQUENCE {
    rach-ConfigCommonTwoStepRA-r16           RACH-ConfigCommonTwoStepRA-r16,
    msgA-PUSCH-Config-r16                            MsgA-PUSCH-Config-r16
OPTIONAL --Cond InitialBWPConfig
}
MsgA-PUSCH-Config-r16 ::=                SEQUENCE{
    msgA-PUSCH-ResourceGroupA-r16                    MsgA-PUSCH-Resource-r16
OPTIONAL, -- Cond InitialBWPConfig
    msg A-PUSCH-ResourceGroupB-r16                   MsgA-PUSCH-Resource-r16
OPTIONAL, -- Cond GroupBConfigured
    msgA-TransformPrecoder-r16               ENUMERATED {enabled, disabled}
OPTIONAL, -- Need R
    msgA-DataScramblingIndex-r16                         INTEGER (0..1023)
OPTIONAL, -- Need S
    msgA-DeltaPreamble-r16                                INTEGER (-1..6)
OPTIONAL    -- Need R
}
MsgA-PUSCH-Resource-r16 ::=              SEQUENCE {
    msgA-MCS-r16                                 INTEGER (0..15),
    nrofSlotsMsgA-PUSCH-r16                      INTEGER (1..4),
    nrofMsgA-PO-PerSlot-r16                      ENUMERATED {one, two, three,
six},
    msgA-PUSCH-TimeDomainOffset-r16              INTEGER (1..32),
    msgA-PUSCH-TimeDomainAllocation-r16               INTEGER (1..maxNrofUL-
Allocations)                             OPTIONAL, -- Need S
    startSymbolAndLengthMsgA-PO-r16                       INTEGER  (0..127)
OPTIONAL, -- Need S
    mappingTypeMsgA-PUSCH-r16                    ENUMERATED {typeA, typeB}
OPTIONAL, -- Need S
    guardPeriodMsgA-PUSCH-r16                             INTEGER (0..3)
OPTIONAL, -- Need R
    guardBandMsgA-PUSCH-r16                      INTEGER (0..1),
```

TABLE 7-continued

```
    frequency StartMsgA-PUSCH-r16                       INTEGER
(0..maxNrofPhysicalResourceBlocks-1),
        nrofPRBs-PerMsgA-PO-r16             INTEGER (1..32),
        nrofMsgA-PO-FDM-r16                 ENUMERATED {one, two, four,
eight},
        msgA-IntraSlotFrequencyHopping-r16  ENUMERATED {enabled}
OPTIONAL, -- Need R
        msgA-HoppingBits-r16                BIT STRING (SIZE(2))
OPTIONAL, -- Cond FreqHopConfigured
        msgA-DMRS-Config-r16                MsgA-DMRS-Config-r16,
        nrofDMRS-Sequences-r16              INTEGER (1..2),
        msgA-Alpha-r16                      ENUMERATED {alpha0, alpha04,
alpha05, alpha06,
                                                alpha07,  alpha08,
alpha09, alpha1}            OPTIONAL, -- Need S
        interlaceIndexFirstPO-MsgA-PUSCH-r16           INTEGER  (1..10)
OPTIONAL, -- Need R
        nrofInterlacesPerMsgA-PO-r 16                  INTEGER  (1..10)
OPTIONAL, -- Need R
        ...
}
```

PRACH preambles for 2-step random access are mapped to MsgA PUSCH resources. A MsgA is transmitted by the UE if the UE transmits a PRACH preamble and the PRACH preamble is mapped to the PUSCH occasion for the MsgA. When PRACH preamble group B for 2-step random access is configured, PRACH preambles of PRACH preamble group A are mapped to the MsgA PUSCH resources configured by msgA-PUSCH-ResourceGroupA-r16, and PRACH preambles of PRACH preamble group B are mapped to the MsgA PUSCH resources configured by msgA-PUSCH-ResourceGroupB-r16.

Multiple DMRS resources may be configured for a PUSCH occasion. DMRS configuration is provided by msgA-DMRS-Config per PUSCH configuration. One or more DMRS ports and one or more DMRS sequences may be configured. A combination of a DMRS port and a DMRS sequence is regarded as a DMRS resource. The basic unit of MsgA PUSCH resources for mapping to PRACH preambles is a PUSCH resource unit, which may be defined as a PUSCH occasion and an associated DMRS resource.

Configurations of PUSCH occasions for MsgA PUSCH are described as follows.

A UE may determine a first RB for a first PUSCH occasion in an initial UL BWP or in an active UL BWP from frequencyStartMsgA-PUSCH that provides an offset, in number of RBs in the initial UL BWP or in the active UL BWP, from a first RB of the initial UL BWP or the active UL BWP. A PUSCH occasion may include a number of RBs provided by nrofPRBs-perMsgA-PO. Consecutive PUSCH occasions in the frequency domain of the initial UL BWP or a UL BWP may be separated by a number of RBs provided by guardBandMsgA-PUSCH. A number $N_f$ of PUSCH occasions in the frequency domain of the initial UL BWP or a UL BWP is provided by nrojMsgA-PO-FDM.

If a UE does not have a dedicated RRC configuration, or has an initial UL BWP as an active UL BWP, or is not provided with startSymbolAndLengthMsgA-PO, msgA-PUSCH-timeDomainAllocation may provide a SLIV and a PUSCH mapping type for a PUSCH transmission by indicating:

one of the first maxNrofUL-Allocations values from PUSCH-TimeDomainResourceAllocationList, if PUSCH-TimeDomainResourceAllocationList is provided in PUSCH-ConfigCommon;

one of the entries from table 6.1.2.1.1-2 or table 6.1.2.1.1-3 in 3GPP TS 38.214 V16.7.0, if PUSCH-TimeDomainResourceAllocationList is not provided in PUSCH-ConfigCommon.

Otherwise, the UE is provided with a SLIV by startSymbolAndLengthMsgA-PO, and a PUSCH mapping type by mappingTypeMsgA-PUSCH for a PUSCH transmission.

For mapping one or multiple preambles of a PRACH slot to a PUSCH occasion associated with a DMRS resource, a UE may determine a first slot for a first PUSCH occasion in an initial UL BWP or in an active UL BWP from msgA-PUSCH-TimeDomainOffset that provides an offset, in number of slots in the initial UL BWP or in the active UL BWP, relative to the start of a PUSCH slot including the start of each PRACH slot. The UE may not expect to have a PRACH preamble transmission and a PUSCH transmission with a msgA in a PRACH slot or in a PUSCH slot, or to have overlapping msgA PUSCH occasions for a MsgA PUSCH configuration. The UE may expect that a first PUSCH occasion in each slot has a same SLIV for a PUSCH transmission that is provided by startSymbolAndLength-MsgA-PO or msgA-PUSCH-timeDomainAllocation.

Consecutive PUSCH occasions within each slot may be separated by guardPeriodMsgA-PUSCH symbols and have the same duration. A number $N_t$ of time domain PUSCH occasions in each slot is provided by nrofMsgA-PO-perSlot, and a number $N_s$ of consecutive slots that include PUSCH occasions is provided by nrofSlotsMsgA-PUSCH.

For mapping of PRACH preambles for 2-step random access to MsgA PUSCH resources, each consecutive number of $N_{preamble}$ preamble indexes from valid PRACH occasions in a PRACH slot may be mapped to a valid PUSCH occasion and the associated DMRS resource. $N_{preamble}$=ceil$(T_{preamble}/T_{PUSCH})$, $T_{preamble}$ is a total number of valid PRACH occasions per association pattern period multiplied by the number of preambles per valid PRACH occasion provided by rach-ConfigCommonTwoStepRA, and $T_{PUSCH}$ is a total number of valid PUSCH occasions per PUSCH configuration per association pattern period multiplied by the number of DMRS resource indexes per valid PUSCH occasion provided by msgA-DMRS-Config.

Each of the $N_{preamble}$ PRACH preambles for mapping may be selected in the following order:

First, in increasing order of preamble indexes within a single PRACH occasion.

Second, in increasing order of frequency resource indexes for frequency-multiplexed PRACH occasions.

Third, in increasing order of time resource indexes for time-multiplexed PRACH occasions within a PRACH slot.

The MsgA PUSCH resource to be mapped to each of the $N_{preamble}$ PRACH preambles may be selected in the following order, where the MsgA PUSCH resource may include a valid PUSCH occasion and an associated DMRS resource:

First, in increasing order of frequency resource indexes $f_{id}$ for frequency-multiplexed PUSCH occasions.

Second, in increasing order of DMRS resource indexes within a PUSCH occasion, where a DMRS resource index $DMRS_{id}$ is determined first in an ascending order of a DMRS port index and second in an ascending order of a DMRS sequence index. Please refer to TS 38.211 V16.7.0.

Third, in increasing order of time resource indexes $t_{id}$ for time-multiplexed PUSCH occasions within a PUSCH slot.

Fourth, in increasing order of indexes for $N_s$ PUSCH slots.

FIG. 2 is a diagram 200 illustrating mapping of PRACH preambles for 2-step random access to MsgA PUSCH resources, according to an example implementation of the present disclosure. PRACH preambles in a PRACH occasion includes 4 sets of PRACH preambles, each set including $N_{preamble}$ PRACH preambles. In FIG. 2, only one PUSCH occasion is configured in the frequency domain, and only one PUSCH slot is associated with the PRACH occasion. It is assumed that 2 DMRS ports are within a PUSCH occasion, where each DMRS port occupies 6 resource elements. Therefore, the sets of PRACH preambles are mapped to the PUSCH resources firstly in increasing order of DMRS resource indexes, and secondly in increasing order of time resource indexes of the PUSCH occasions. Specifically, preamble set #1 is mapped to PUSCH occasion #1 and the associated first DMRS port, preamble set #2 is mapped to PUSCH occasion #1 and the associated second DMRS port, preamble set #3 is mapped to PUSCH occasion #2 and the associated first DMRS port, and preamble set #4 is mapped to PUSCH occasion #2 and the associated second DMRS port.

PUSCH occasions configured by msgA-PUSCH-ResourceGroupA-r16 and msgA-PUSCH-ResourceGroupB-r16 are subject to validation based on the following rules:

A PUSCH occasion is valid if it does not overlap in time and frequency with any valid PRACH occasion associated with either a 4-step random access procedure or a 2-step random access procedure. Additionally, for unpaired spectrum and for SSB with indexes provided by ssb-PositionsInBurst in SIB1 or by ServingCellConfigCommon:

if a UE is not provided with tdd-UL-DL-Configuration-Common, a PUSCH occasion is valid if:
  the PUSCH occasion does not precede an SSB in the PUSCH slot, and
  the PUSCH occasion starts at least $N_{gap}$ symbols after a last SSB symbol, where $N_{gap}$ is provided in Table 6.

if a UE is provided with tdd-UL-DL-ConfigurationCommon, a PUSCH occasion is valid if:
  the PUSCH occasion is within UL symbols, or
  the PUSCH occasion does not precede an SSB in the PUSCH slot, and
  the PUSCH occasion starts at least $N_{gap}$ symbols after a last downlink symbol and at least $N_{gap}$ symbols after a last SSB symbol, where $N_{gap}$ is provided in Table 6 and, if channelAccessMode=semistatic is provided, does not overlap with a set of consecutive symbols before the start of a next channel occupancy time where the UE does not transmit as specified in the 3GPP TS 37.213 V16.6.0.

In Rel-15, a DCI is transmitted using one or more control channel elements (CCE) contained in a CORESET. Configurations of a CORESET may include PRBs (e.g., the frequency domain resource of the CORESET) and the number of OFDM symbols (e.g., the time domain resource of the CORESET). One or more search spaces may be associated with a CORESET. A search space defines the frequency of occurrence of the associated CORESET, and one occurrence of the CORESET may be referred to as a monitoring occasion. The configuration of a search space may include the periodicity and time offset of the search space and the duration of the search space, e.g., the consecutive number of slots in which one or more monitoring occasions exists. If the duration is one, only one or more monitoring occasions within one slot exist in each period.

In Rel-15, SIB1 may include information regarding the availability and scheduling (e.g., mapping of SIBs to SI message, periodicity, SI-window size) of other SIBs with an indication whether one or more SIBs are only provided on-demand and, in that case, the configuration needed by the UE to perform the SI request. SIBs other than SIB1 are carried in SystemInformation (SI) messages, which are transmitted on the DL-SCH. Only SIBs having the same periodicity may be mapped to the same SI message. Each SI message is transmitted within periodically occurring time domain windows (referred to as SI-windows with the same length for all SI messages). Each SI message is associated with an SI-window, and the SI-windows of different SI messages do not overlap. Within one SI-window, only the corresponding SI message is transmitted.

Issues related to PRACH resource configuration and mapping of PRACH preambles to MsgA PUSCH will be discussed in the present disclosure.

PRACH Resource Configuration

To identify RedCap UEs via PRACH transmission, PRACH resources may be configured specifically for RedCap UEs so that the gNB may identify the UEs using the PRACH resources as RedCap UEs. The ROs for RedCap UEs may be shared with the ROs for legacy UEs, or the ROs for RedCap UEs may be separate from the ROs for legacy UEs. When the ROs for RedCap UEs are shared with the ROs for legacy UEs, PRACH preambles for RedCap UEs may be separate from the PRACH preambles for legacy UEs.

Besides identification of RedCap UEs, the gNB may also need to identify UEs via PRACH transmission with the following features.

Small data transmission (SDT): A UE may transmit a PRACH preamble using PRACH resources configured specifically for UEs initiating an RA-SDT procedure. The gNB may allocate Msg3 with larger TBS after identifying the UE that initiated the RA-SDT procedure via PRACH transmission.

Coverage enhancement (CE): A UE may transmit a PRACH preamble using PRACH resources configured specifically for UEs that need coverage enhancement. The gNB may allocate PUSCH for Msg3 with repetition after identifying the UE that needs coverage enhancement via PRACH transmission.

Slicing: A UE may transmit a PRACH preamble using PRACH resources configured specifically for UEs that selected specific network slice(s). The gNB may identify the UE that selected specific network slice(s) via PRACH transmission.

There is also a need for identification of UEs with a combination of the above features via PRACH transmission. For example, a RedCap UE may also need coverage enhancement. A combination of features may also be referred to as a feature combination in the present disclosure.

Besides the above features, PRACH preamble group B and 2-step random access may also be combined. Some combinations of features are not justified, e.g., coverage enhancement combined with 2-step random access and coverage enhancement combined with SDT, since the prerequisite of 2-step random access and SDT is good channel condition. There are $2^5-1=31$ feature combinations that include at least one of {RedCap, SDT, slicing, 2-step, group B} and there are $2^3=8$ combinations that include CE combined with combinations of {RedCap, slicing, group B}. As a result, up to 40 PRACH preamble partitions may be required if ROs for all the feature combinations and for legacy UEs (with group A and 4-step random access) are shared. Since there are at most 64 preambles for a RO, there is only one preamble for each feature combination if there are up to 40 feature combinations. Such a small number of preambles may result in higher collision probability of PRACH transmission, which increases the latency of initial access. As such, it may make more sense to configure ROs for some feature combinations to be separate from ROs for some other feature combinations. A method to configure PRACH resources for some feature combinations with ROs shared with legacy UEs and configure PRACH resources for some other feature combinations with ROs not shared with legacy UEs may be needed to efficiently utilize the radio resources.

Mapping of PRACH Preambles to MsgA PUSCH

For RedCap UEs, the MsgA PUSCH configuration may be different from the MsgA PUSCH configuration for legacy UEs, e.g., intra-slot frequency hopping may not be enabled for RedCap UEs. For UEs initiating RA-SDT, the MsgA PUSCH configuration may be different from the MsgA PUSCH configuration for legacy UEs, e.g., to accommodate larger TBS. As such, more MsgA PUSCH configurations in addition to the existing MsgA PUSCH configurations may be needed to support new feature combinations. A method for mapping of PRACH preambles for the feature combinations to the MsgA PUSCH configurations may be needed.

To deal with the issues mentioned above, some implementations are provided in the present disclosure.

BWP-UplinkCommon may include a first IE (e.g., rach-ConfigCommon-r17) to configure ROs and preambles for feature combinations of at least one of {RedCap, CE, SDT, slicing} and optionally of group B. The first IE may include rach-ConfigGeneric, which may include prach-ConfigurationIndex, msg1-FDM, and msg1-FrequencyStart. In the following, unless explicitly stated, IEs that are described are included in the first IE. prach-ConfigurationIndex may be absent, and if prach-ConfigurationIndex is absent, the value configured by prach-ConfigurationIndex in rach-ConfigCommon is used. prach-ConfigurationIndex may configure the same or different values from that configured by prach-ConfigurationIndex in rach-ConfigCommon. msg1-FDM may be absent, and if msg1-FDM is absent, the value configured by msg1-FDM in rach-ConfigCommon is used. msg1-FDM may configure the same or different values from that configured by msg1-FDM in rach-ConfigCommon. When prach-ConfigurationIndex and msg1-FDM are both absent, or when the values configured by prach-ConfigurationIndex and msg1-FDM are the same as that configured by prach-ConfigurationIndex and msg1-FDM in rach-ConfigCommon, SSB-PerRACH-Occasion should configure the same value as that configured by SSB-PerRACH-Occasion in rach-ConfigCommon, or SSB-PerRACH-Occasion should be absent and the value configured by SSB-PerRACH-Occasion in rach-ConfigCommon is used. When prach-ConfigurationIndex and msg1-FDM are both absent or when the values configured by prach-ConfigurationIndex and msg1-FDM are the same as that configured by prach-ConfigurationIndex and msg1-FDM in rach-ConfigCommon, msg1-FrequencyStart may be present or absent. If msg1-FrequencyStart is absent, the ROs configured by the IE are the same as the ROs configured by rach-ConfigCommon. On the other hand, if msg1-FrequencyStart is present, the value configured by msg1-FrequencyStart should be different from the value configured by msg1-FrequencyStart in rach-ConfigCommon. The ROs configured by the first IE are not the same as the ROs configured by rach-ConfigCommon.

Figure 3:
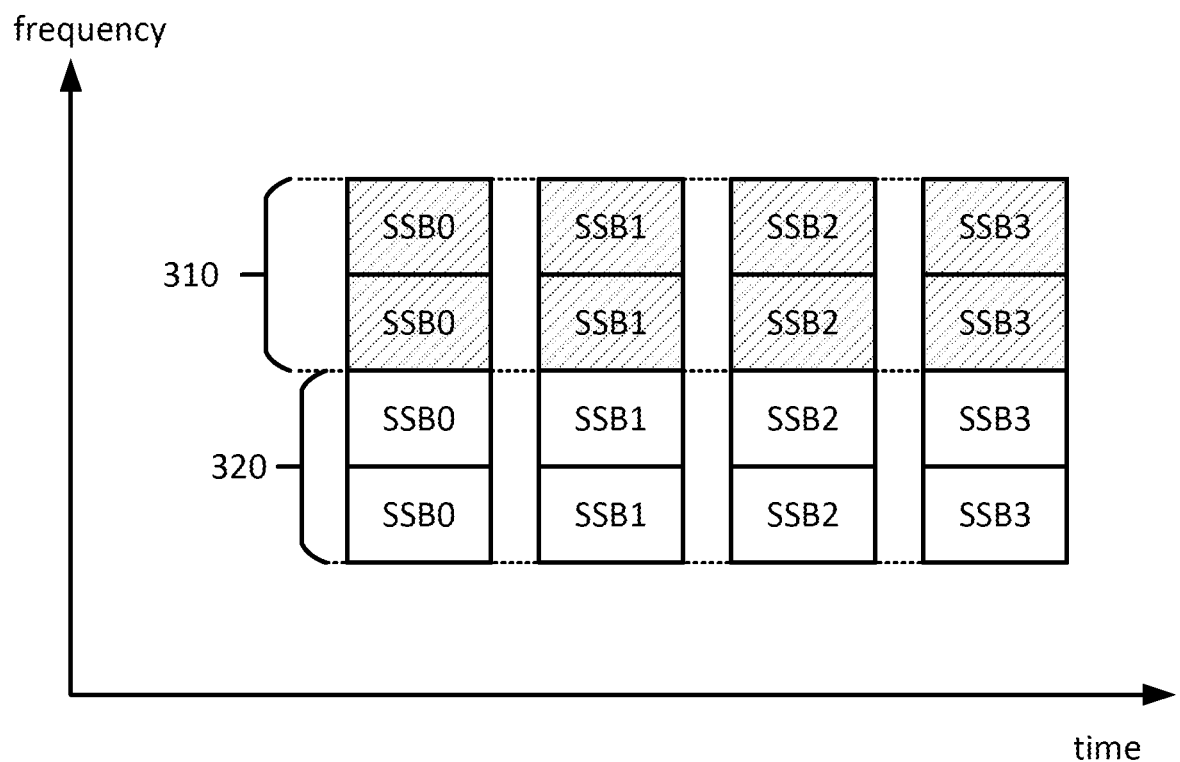
FIG. 3 is a diagram illustrating an example in which PRACH (or Random Access Channel (RACH)) occasions (ROs) configured via rach-ConfigCommon-r17 are separate from ROs for legacy UEs, according to an example implementation of the present disclosure.

FIG. 3 is a diagram 300 illustrating an example in which ROs configured via rach-ConfigCommon-r17 are separate from ROs for legacy UEs, according to an example implementation of the present disclosure. Both prach-ConfigurationIndex and msg1-FDM are absent in rach-ConfigCommon-r17. In other words, prach-ConfigurationIndex and msg1-FDM indicated in rach-ConfigCommon are reused for determining ROs for Rel-17 UEs. msg1-FrequencyStart in rach-ConfigCommon-r17 configures a different value from the value configured by msg1-FrequencyStart in rach-ConfigCommon, which results in the ROs for Rel-17 UEs and the ROs for legacy UEs being FDMed. As illustrated in FIG. 3, ROs 310 for Rel-17 UEs are separate from ROs 320 for legacy UEs.

When prach-ConfigurationIndex configures the same value as that configured by prach-ConfigurationIndex in rach-ConfigCommon or when prach-ConfigurationIndex is absent, and when msg1-FDM configures a different value from that configured by msg1-FDM in rach-ConfigCommon, the value configured by msg1-FrequencyStart may be the same or different from that configured by msg1-FrequencyStart in rach-ConfigCommon. msg1-FrequencyStart may be absent, and if msg1-FrequencyStart is absent, the value configured by msg1-FrequencyStart in rach-ConfigCommon is used.

Figure 4:
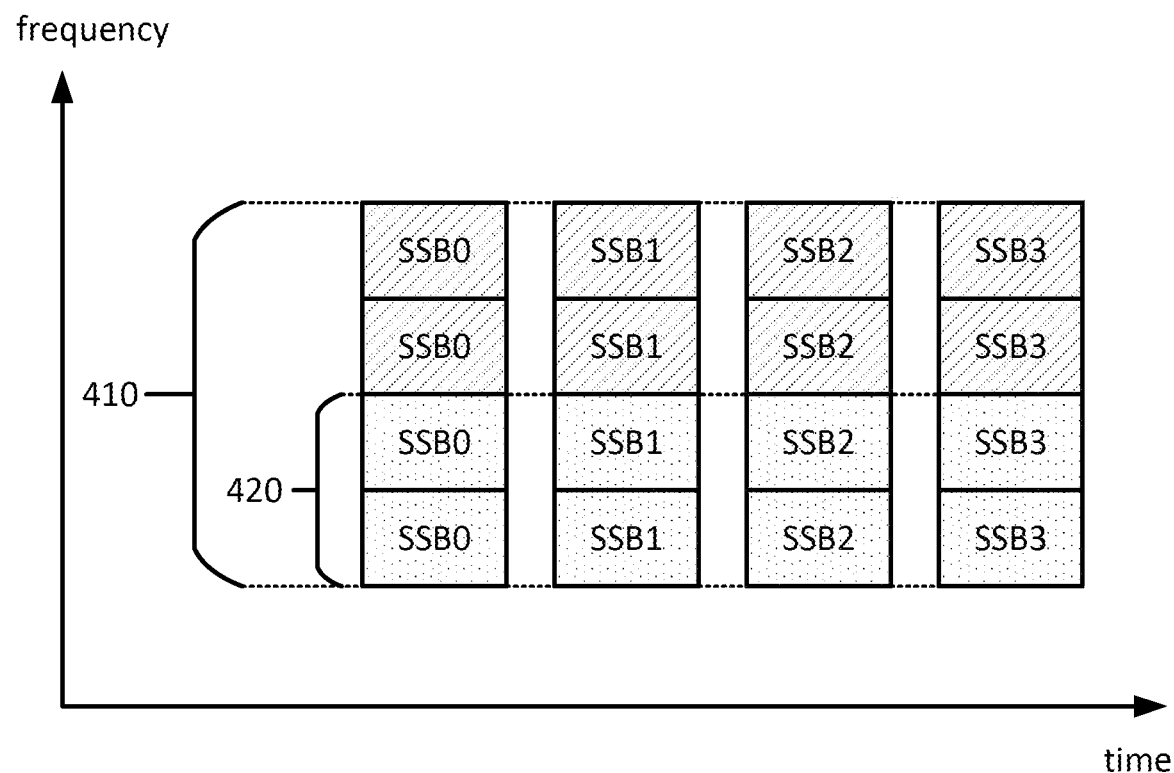
FIG. 4 is a diagram illustrating an example in which ROs configured via rach-ConfigCommon-r17 are partially shared with ROs for legacy UEs, according to an example implementation of the present disclosure.

FIG. 4 is a diagram 400 illustrating an example in which ROs configured via rach-ConfigCommon-r17 are partially shared with ROs for legacy UEs, according to an example implementation of the present disclosure. prach-ConfigurationIndex in rach-ConfigCommon-r17 is absent and value 4 is configured by msg1-FDM in rach-ConfigCommon-r17 and value 2 is configured by msg1-FDM in rach-ConfigCommon. msg1-FrequencyStart in rach-ConfigCommon-r17 configures the same value as the value configured by msg1-FrequencyStart in rach-ConfigCommon. In the example, since the FDMed ROs configured by msg1-FDM in rach-ConfigCommon-r17 are twice the value configured by msg1-FDM in rach-ConfigCommon, to achieve the same SSB-to-RO mapping in time domain, SSB-PerRACH-Occasion in rach-ConfigCommon-r17 may configure a value (e.g., ¼) that is half of the value configured by SSB-PerRACH-Occasion in rach-ConfigCommon (e.g., ½). As illustrated in FIG. 4, ROs 410 for Rel-17 UEs are partially shared with ROs 420 for legacy UEs.

When the value configured by msg1-Frequency Start in rach-ConfigCommon-r17 is not the same as that configured by msg1-Frequency Start in rach-ConfigCommon, in order for the Rel-17 UEs that have transmitted a PRACH preamble configured via rach-ConfigCommon-r17 to receive a first RAR separately from a second RAR for the legacy UEs that have transmitted a PRACH preamble configured via rach-ConfigCommon, an offset to f_id for calculation of RA-RNTI may be determined by the UE or explicitly configured based on the relative frequency position of the FDMed ROs for Rel-17 UEs and FDMed ROs for legacy UEs. For example, in FIG. 3, the UE may determine the offset to f_id is 2 for calculation of RA-RNTI since the first FDMed RO (lowest in frequency) for the Rel-17 UE is separated from the first FDMed RO (lowest in frequency) for the legacy UEs by 2 ROs in frequency domain.

The ROs configured by the first IE may all be able to indicate a first feature, e.g., RedCap. The first feature may be configured by a second IE included in the first IE. All feature combinations that may be indicated via the UE's PRACH transmission configured by the first IE include at least the first feature. In this case, all feature combinations include at least the first feature, and a feature combination that include at least a second feature besides the first feature may be indicated via the UE's PRACH transmission on a subset of ROs which may be configured by a PRACH mask index. In this case, a PRACH mask index may be used to indicate the ROs that are reserved (e.g., not used to indicate any feature or feature combination). Alternatively, each of the feature combinations, including a feature combination with only a single feature, is provided with an associated PRACH mask index. In this case, a RO not indicated by any PRACH mask index is reserved. It is also possible that a feature combination is associated with more than one PRACH mask index, or PRACH occasion indexes may be directly configured for a feature combination to indicate ROs that are not able to be indicated by a single PRACH mask index.

The PRACH preambles configured by the first IE may all be able to indicate the first feature. In this case, the number of preambles that may be used to indicate only the first feature may be configured by ssb-perRACH-OccasionAndCB-PreamblesPerSSB. All feature combinations include at least the first feature, and a feature combination that includes at least a second feature besides the first feature may be indicated by PRACH preambles configured by a third IE (e.g., CB-PreamblesPerSSB-r17) used to configure the number of preambles per SSB for the feature combination. Alternatively, each of the feature combinations, including a feature combination with only a single feature, may be provided with an associated third IE.

A fourth IE may be used to configure the features included in a feature combination. A list of the fourth IEs may be used to configure the feature combinations that may be indicated. The fourth IE may include a list of fifth IEs, where a fifth IE indicates a single feature.

An implementation of the fifth IE may be:
feature ENUMERATED {RedCap, CE, SDT, Slicing, spare1, spare2, spare3, spare4}
Another implementation of the fifth IE may be:
feature ENUMERATED {RedCap, CE, SDT, Slicing, groupB, spare2, spare3, spare4}

The above-mentioned PRACH mask index and the third IE may be included in a fourth IE. Alternatively, a list of PRACH mask indexes may be configured, and the PRACH mask index with an ordinal position in the list of PRACH mask indexes may be associated with the fourth IE with the ordinal position in the list of fourth IEs. Similarly, a list of third IEs may be configured, and the third IE with an ordinal position in the list of third IEs may be associated with the fourth IE with the ordinal position in the list of fourth IEs.

The starting preamble mapped to an SSB for a feature combination associated with a RO is the next preamble after the last preamble mapped to the SSB for a previous feature combination associated with the RO, where the order of the feature combinations may be determined based on the order of the IEs used to configure the feature combinations, e.g., based on the order of the fourth IE corresponding to the feature combination in the list of the fourth IEs. In some implementations, when the ROs for a feature combination are shared with legacy UEs, a preamble start index may be configured for the UE to determine the starting preamble for the first feature or feature combination configured by the list of the fourth IEs. The preamble start index may indicate the starting preamble for the first feature or feature combination for the first SSB mapped to a RO. The preamble start index for the first feature or feature combination for other SSBs mapped to the RO may be determined to be with $o \cdot N_{preable}^{total}/N$ offsets from the indicated preamble start index, where N is the number of SSBs mapped to the RO, $N_{preable}^{total}$ is the value provided by totalNumberOfRA-Preambles in rach-ConfigCommon, and $o=1, 2, \ldots, N-1$ is the order of the SSB mapped to the RO after the first SSB that is mapped to the RO.

Preamble group B may also be configured for a feature combination. The number of preambles of preamble group A for an SSB for the feature combination may be explicitly configured, and the number of preambles of preamble group B for the SSB for the feature combination may be determined implicitly by the value configured by the third IE minus the number of preambles of preamble group A for the SSB for the feature combination.

BWP-UplinkCommon may include a sixth IE (e.g., msgA-ConfigCommon-r17) to configure ROs, preambles, and PUSCH occasions for feature combinations of 2-step random access, of at least one of {RedCap, CE, SDT, slicing} and optionally of group B. The sixth IE may include a seventh IE (e.g., rach-ConfigCommonTwoStepRA-r17) used to configure the ROs and preambles, and may include an eighth IE (e.g., msgA-PUSCH-Config-r17) used to configure the PUSCH occasions.

The seventh IE may include rach-ConfigGenericTwoStepRA-r16, which may include msgA-prach-ConfigurationIndex-r16, msgA-RO-FDM-r16, and msgA-RO-Frequency Start. In the following, unless explicitly stated, IEs that are described are included in the seventh IE. msgA-prach-ConfigurationIndex-r16 may be absent, and if msgA-prach-ConfigurationIndex-r16 is absent, the value configured by prach-ConfigurationIndex in rach-ConfigCommon or by msgA-prach-ConfigurationIndex-r16 in rach-ConfigCommonTwoStepRA-r16 is used. In one implementation, msgA-prach-ConfigurationIndex-r16 is absent, but is configured by both prach-ConfigurationIndex in rach-ConfigCommon and by msgA-prach-ConfigurationIndex-r16 in rach-ConfigCommonTwoStepRA-r16; in this case, the value configured by rach-ConfigCommonTwoStepRA-r16 is used. In one implementation, msgA-prach-ConfigurationIndex-r16 is absent, but is configured by either prach-ConfigurationIndex in rach-ConfigCommon or by msgA-prach-ConfigurationIndex-r16 in rach-ConfigCommonTwoStepRA-r16; in this case, the value configured by either rach-ConfigCommon or rach-ConfigCommonTwoStepRA-r16 is used. msgA-prach-ConfigurationIndex-r16 may configure the same or different values from that configured by prach-ConfigurationIndex in rach-ConfigCommon or by msgA-prach-ConfigurationIndex-r16 in rach-ConfigCommonTwoStepRA-r16. msgA-RO-FDM-r16 may be absent, and if msgA-RO-FDM-r16 is absent, the value configured by msg1-FDM in rach-Config- Common or by msgA-RO-FDM-r16 in rach-ConfigCommonTwoStepRA-r16 is used. msgA-RO-FDM-r16 may configure the same or different values from that configured by msg1-FDM in rach-ConfigCommon or by msgA-RO-FDM-r16 in rach-ConfigCommonTwoStepRA-r16. Methods for configuration of the IEs in the seventh IE are similar to the methods for configuration of the IEs in the first IE, with the differences that the IEs in the first IE are replaced by the 2-step random access counterpart in the seventh IE, and the IEs in rach-ConfigCommon are replaced by the 2-step random access counterpart in rach-ConfigCommonTwoStepRA-r16 when the ROs for legacy 2-step random access are separate from the ROs for legacy 4-step random access. Thus, detailed description is omitted.

The methods for configuration of feature combinations of 2-step random access of at least one of {RedCap, CE, SDT, slicing} and optionally of group B may be the same as the methods for configuration of feature combinations of at least one of {RedCap, CE, SDT, slicing} and optionally of group B, as previously described.

msgA-PUSCH-Config-r17 may include more than 2 PUSCH configurations. msgA-PUSCH-ResourceGroupA-r16 and msgA-PUSCH-ResourceGroupB-r16 may be included in msgA-PUSCH-Config-r17, and if msgA-PUSCH-ResourceGroupA-r16 and msgA-PUSCH-ResourceGroupB-r16 are absent in msgA-PUSCH-Config-r17, the configurations provided by msgA-PUSCH-ResourceGroupA-r16 and msgA-PUSCH-ResourceGroupB-r16 in msgA-PUSCH-Config-r16 are used.

The alternatives in the following may be used to avoid the situation where a set of PRACH preambles (e.g., $N_{preamble}$ PRACH preambles) cannot be mapped to a PUSCH resource (e.g., a PUSCH occasion and an associated DMRS resource). In other words, preamble sets determined based on $N_{preamble}$ may not match the preambles configured for features or feature combinations, since according to current rules, $N_{preamble}$ is determined as $\operatorname{ceil}(T_{preamble}/T_{PUSCH})$, where $T_{preamble}$ is a total number of valid PRACH occasions per association pattern period multiplied by the number of preambles (all PRACH preambles in a PRACH occasion) per valid PRACH occasion provided by rach-ConfigCommonTwoStepRA, and $T_{PUSCH}$ is a total number of valid PUSCH occasions per PUSCH configuration per association pattern period multiplied by the number of DMRS resource indexes per valid PUSCH occasion provided by msgA-DMRS-Config. $N_{preamble}$ is an average number of PRACH preambles that need to be mapped to a PUSCH resource. However, when different ROs are configured with different number of PRACH preambles, and when the MsgA PUSCH configuration is configured based on the average number, there may be cases where a number of PRACH preambles for features or feature combinations in a RO do not have available PUSCH resources for mapping.

Figure 5:
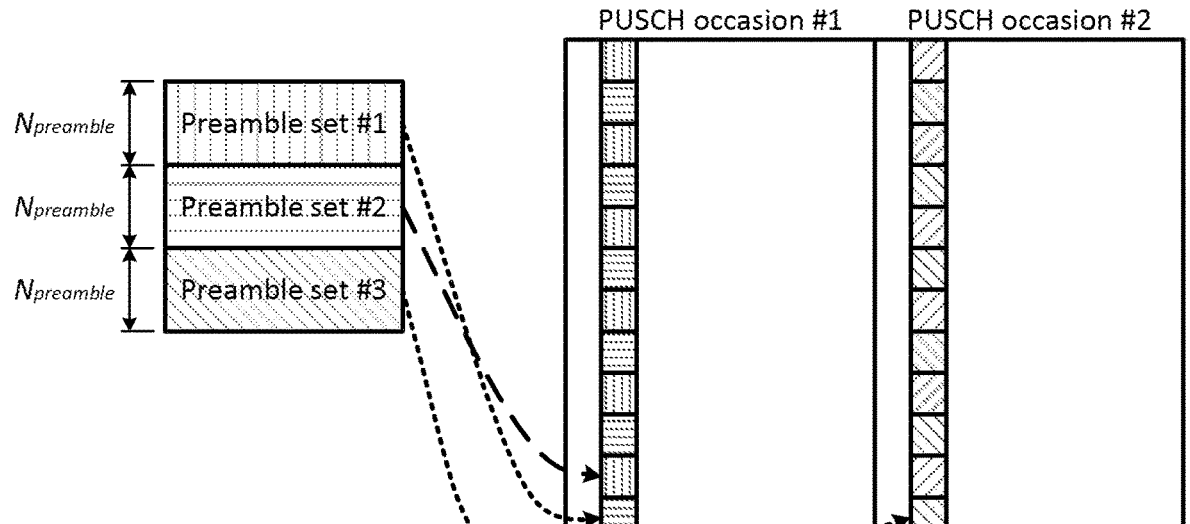
FIG. 5 is a diagram illustrating an example in which a set of PRACH preambles does not have available PUSCH resource for mapping, according to an example implementation of the present disclosure.
Figure 5:
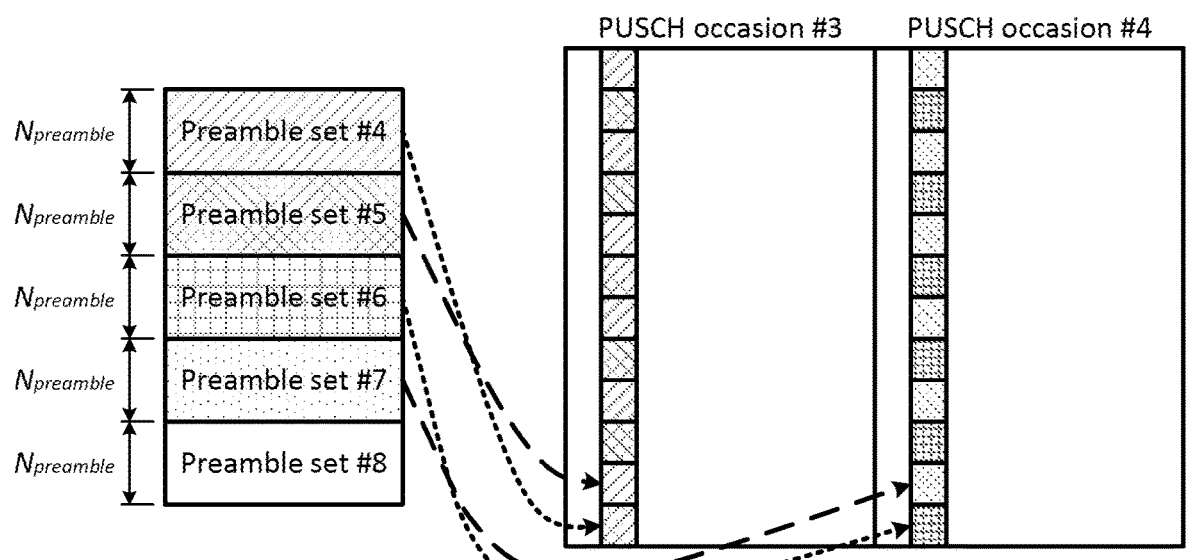

FIG. 5 is a diagram 500 illustrating an example in which a set of PRACH preambles does not have available PUSCH resource for mapping, according to an example implementation of the present disclosure. It is assumed that two ROs are within an association pattern period and the first RO is configured with PRACH preambles for 3 feature combinations, and the second RO is configured with PRACH preambles for 5 feature combinations, each feature combination is configured with 8 PRACH preambles. For each RO, a PUSCH slot with 2 PUSCH occasions are configured, and each PUSCH occasion has 2 associated DMRS ports. For this example, $T_{preamble}$ is 64, $T_{PUSCH}$ is 8, and $N_{preamble}$ is determined as 8. The PRACH preambles for the first feature combination in the first RO (e.g., preamble set #1) are mapped to PUSCH occasion #1 and the associated first DMRS port. The PRACH preambles for the second feature combination in the first RO (e.g., preamble set #2) are mapped to PUSCH occasion #1 and the associated second DMRS port. The PRACH preambles for the third feature combination in the first RO (e.g., preamble set #3) are mapped to PUSCH occasion #2 and the associated first DMRS port. The PRACH preambles for the fourth feature combination in the second RO (e.g., preamble set #4) are mapped to PUSCH occasion #3 and the associated first DMRS port. The PRACH preambles for the fifth feature combination in the second RO (e.g., preamble set #5) are mapped to PUSCH occasion #3 and the associated second DMRS port. The PRACH preambles for the sixth feature combination in the second RO (e.g., preamble set #6) are mapped to PUSCH occasion #4 and the associated first DMRS port. The PRACH preambles for the seventh feature combination in the second RO (e.g., preamble set #7) are mapped to PUSCH occasion #4 and the associated second DMRS port. However, the PRACH preambles for the eighth feature combination in the second RO (e.g., preamble set #8) are not mapped to any PUSCH resources.

For mapping of PRACH preambles to the PUSCH configurations, each PUSCH configuration may be associated with a PUSCH configuration index, and configuration of a feature or a feature combination may include a PUSCH configuration index to indicate the PUSCH configuration mapped to the preambles for the feature or feature combination. In some implementations, PUSCH configuration provided by msgA-PUSCH-ResourceGroupA-r16 and msgA-PUSCH-ResourceGroupB-r16 in MsgA-PUSCH-Config-r16 are associated with PUSCH configuration index 0 and 1, respectively.

In some implementations, a PUSCH configuration may be associated with a specific feature or feature combination, or a pair of PUSCH configurations may be associated with a specific feature or feature combination with one PUSCH configuration mapped to the preamble group A for the specific feature or feature combination and one PUSCH configuration mapped to the preamble group B for the specific feature or feature combination. A default PUSCH configuration or a pair of default PUSCH configurations may be configured, e.g., by msgA-PUSCH-ResourceGroupA-r16 and msgA-PUSCH-ResourceGroupB-r16 for mapping preambles for feature or feature combinations not including the specific feature or feature combination associated with any PUSCH configurations.

For determination of a mapping ratio between PRACH preambles and a PUSCH occasion associated with a DMRS resource, e.g., $N_{preamble}=\operatorname{ceil}(T_{preamble}/T_{PUSCH})$, $T_{preamble}$ may be defined as a total number of valid PRACH occasions for all feature combinations per association pattern period multiplied by the number of preambles per valid PRACH occasion provided by rach-ConfigCommonTwoStepRA, and $T_{PUSCH}$ may be defined as a total number of valid PUSCH occasions per PUSCH configuration per association pattern period multiplied by the number of DMRS resource indexes per valid PUSCH occasion provided by msgA-DMRS-Config. It is noted that a PRACH occasion may be valid if the PRACH occasion is indicated by at least a PRACH mask index or a PRACH occasion index associated with a feature or feature combination. In some implementations, mapping of PRACH preambles and a PUSCH occasion associated with a DMRS resource is performed per feature or feature combination for an association pattern period. The mapping ratio is determined per feature or feature combination. $T_{preamble}$ is the number of PRACH preambles configured for a feature or feature combination. In some implementations, mapping of PRACH preambles and a PUSCH occasion associated with a DMRS resource is performed per PRACH occasion index for an association pattern period. The mapping ratio is determined per PRACH occasion index. $T_{preamble}$ is the number of PRACH preambles of the PRACH occasions associated with a PRACH occasion index within an association pattern period.

In some implementations, a PUSCH occasion is valid if the PUSCH occasion is within a slot that is an offset, provided by msgA-PUSCH-TimeDomainOffset, relative to the start of a PUSCH slot including the start of a PRACH slot including a valid PRACH occasion. In some implementations, a PUSCH occasion is also valid if the PUSCH occasion is within X-1 slots from the slot, where X is provided by nrofSlotsMsgA-PUSCH.

In some implementations, the number of preambles for each valid PRACH occasion may be different. The maximum number of preambles for all valid PRACH occasions is used to calculate $T_{preamble}$ in this case. This method may be beneficial because all PRACH preambles can be mapped to a PUSCH occasion. Alternatively, the minimum number of preambles for all valid PRACH occasions is used to calculate $T_{preamble}$ in this case. This method may be beneficial because the mapping ratio of preamble-to-PUSCH resource can be kept lower, which can guarantee the reception performance of MsgA PUSCH.

In some implementations, the mapping ratio between PRACH preambles and a PUSCH occasion associated with a DMRS resource for a PUSCH configuration is determined per PRACH occasion. The number of PUSCH occasions that may be mapped to PRACH preambles of a PRACH occasion may be $N_s \cdot N_t$, and the $N_s \cdot N_t$ PUSCH occasions start from O PUSCH slots relative to the start of a PUSCH slot including the start of the PRACH slot including the PRACH occasion, where $N_s$, $N_t$, and O are provided by nrofSlotsMsgA-PUSCH, nrofMsgA-PO-perSlot, and msgA-PUSCH-TimeDomainOffset, respectively. The mapping ratio may be determined as $N_{preamble}$ ceil($T_{preamble}/T_{PUSCH}$) $T_{preamble}$ may be defined as the total number of preambles for all feature combinations of the PRACH occasion associated with the PUSCH configuration, and $T_{PUSCH}$ may be defined as a total number of valid PUSCH occasions from the $N_s$ $N_t$ PUSCH occasions for the PUSCH configuration multiplied by the number of DMRS resource indexes per valid PUSCH occasion provided by msgA-DMRS-Config.

In some implementations, the mapping ratio between PRACH preambles and a PUSCH occasion associated with a DMRS resource for a PUSCH configuration is determined per PRACH slot or per the number of PRACH slots included in a PUSCH slot. The number of PUSCH occasions that may be mapped to PRACH preambles of PRACH occasions of one more PRACH slots may be $N_s N_t$, and the $N_s \cdot N_t$ PUSCH occasions start from O PUSCH slots relative to the start of a PUSCH slot including the start of the one or more PRACH slots, where $N_s$, $N_t$, and O are provided by nrofSlotsMsgA-PUSCH, nrofMsgA-PO-perSlot, and msgA-PUSCH-TimeDomainOffset, respectively. The mapping ratio may be determined as $N_{preamble}$=ceil($T_{preamble}/T_{PUSCH}$) $T_{preamble}$ may be defined as the total number of preambles for all feature combinations of the PRACH occasions associated with the PUSCH configuration, and $T_{PUSCH}$ may be defined as a total number of valid PUSCH occasions from the $N_s$ $N_t$ PUSCH occasions for the PUSCH configuration multiplied by the number of DMRS resource indexes per valid PUSCH occasion provided by msgA-DMRS-Config.

Figure 6:
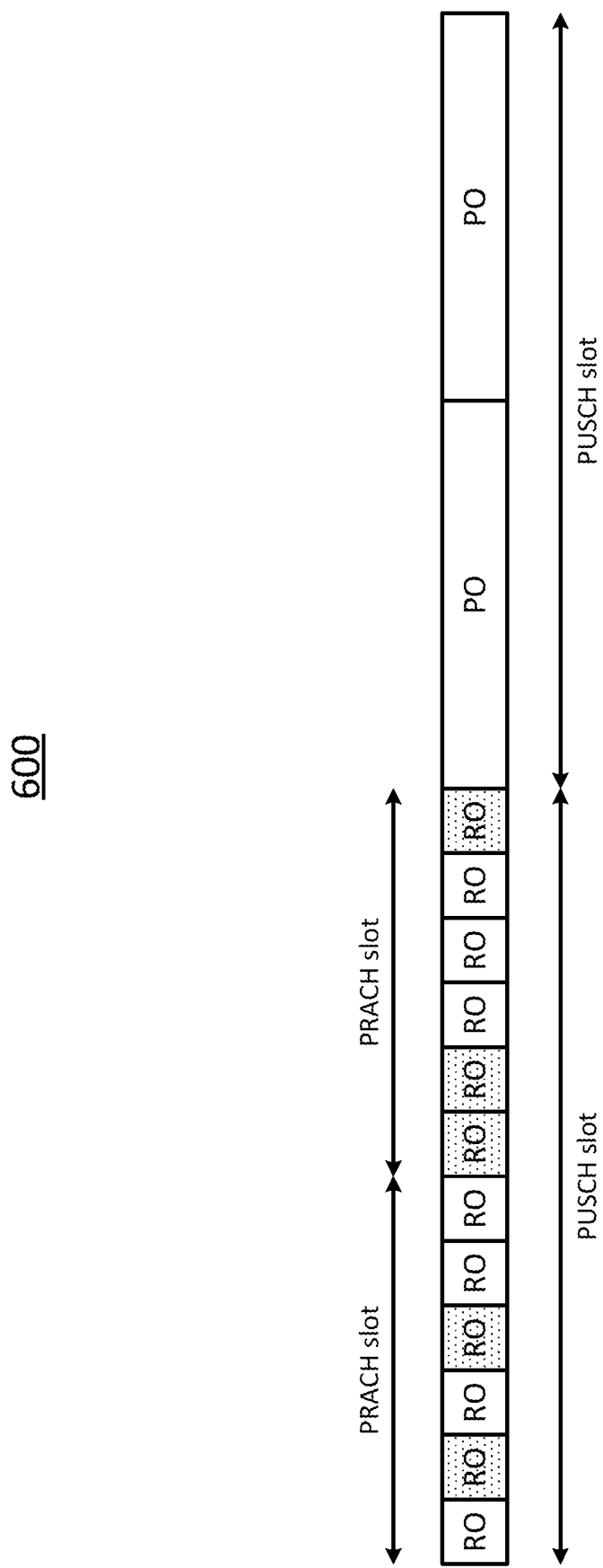
FIG. 6 is a diagram illustrating PRACH slots and PUSCH slots, according to an example implementation of the present disclosure.

FIG. 6 is a diagram 600 illustrating PRACH slots and PUSCH slots, according to an example implementation of the present disclosure. In this example, two PRACH slots are included in one PUSCH slot, nrofSlotsMsgA-PUSCH indicates 1, and nrofMsgA-PO-perSlot indicates 2. The second, fourth, seventh, eighth, and twelfth ROs are configured with associated feature combinations. The mapping ratio is determined by the PRACH preambles in the ROs and the 2 PUSCH occasions (POs).

Figure 7:
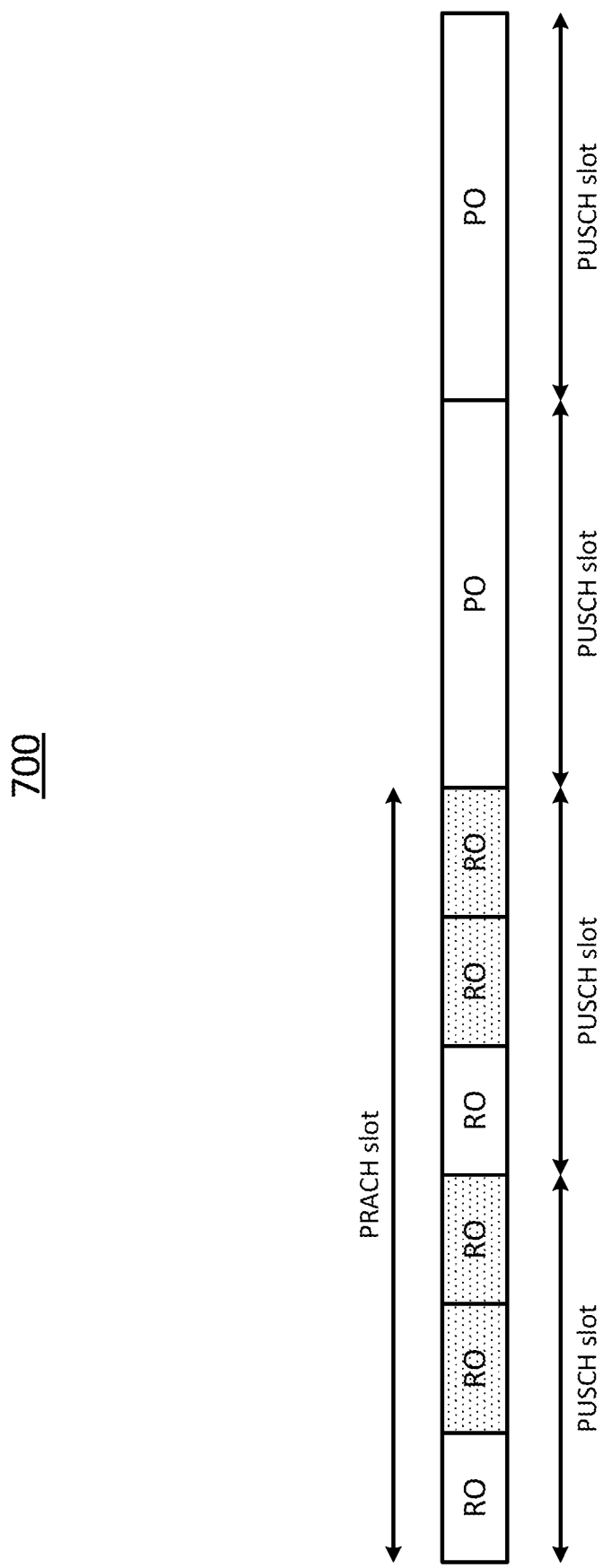
FIG. 7 is a diagram illustrating PRACH slots and PUSCH slots, according to another example implementation of the present disclosure.

FIG. 7 is a diagram 700 illustrating PRACH slots and PUSCH slots, according to another example implementation of the present disclosure. In this example, one PRACH slot includes two PUSCH slots, nrofSlotsMsgA-PUSCH indicates 2, and nrofMsgA-PO-perSlot indicates 1. The second, third, fifth, and sixth ROs are configured with associated feature combinations. The mapping ratio is determined by the PRACH preambles in the ROs and the 2 PUSCH occasions (POs).

Figure 8:
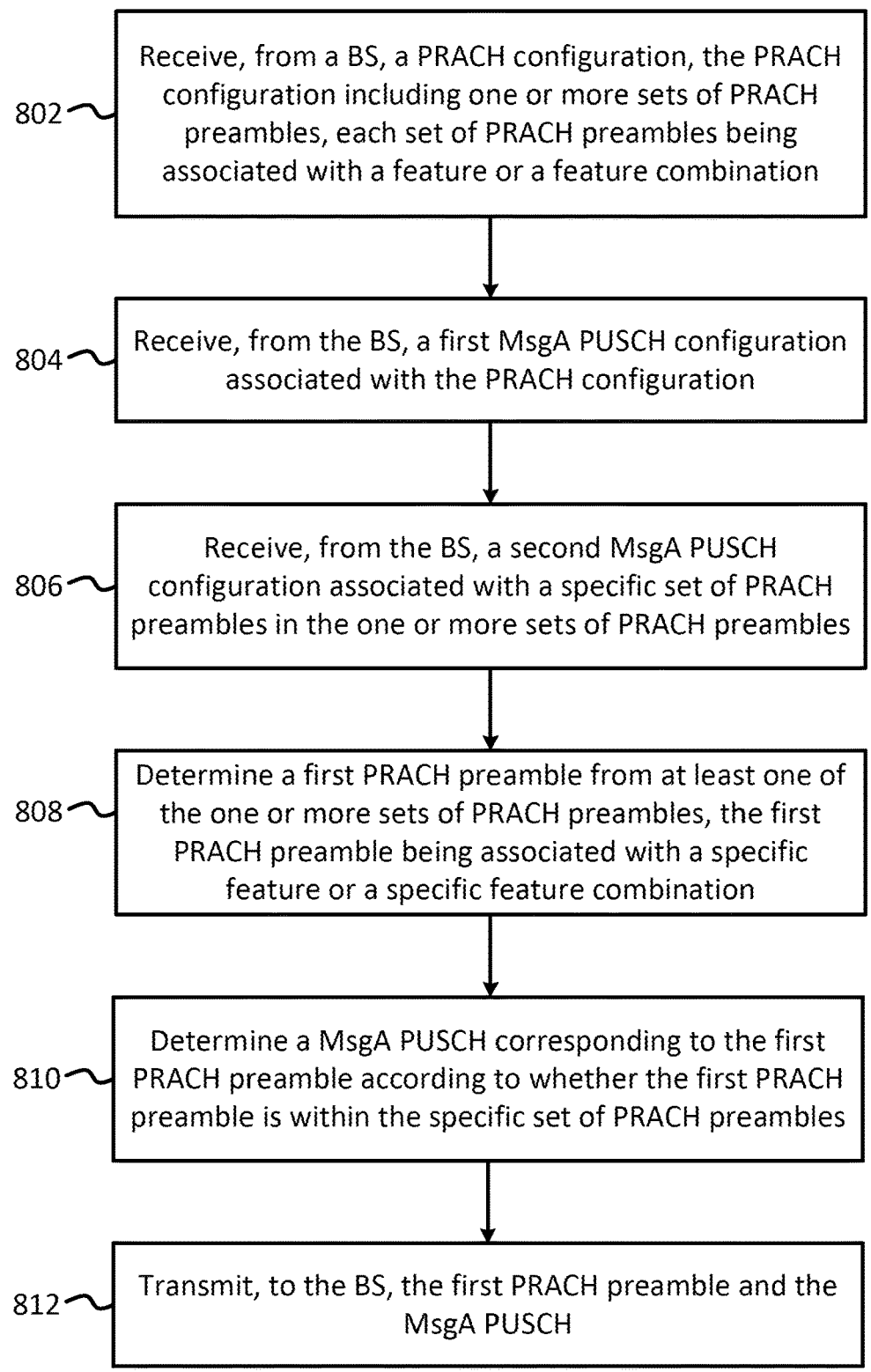
FIG. 8 is a flowchart illustrating a method/process performed by a UE for MsgA transmission in a two-step RA procedure, according to an example implementation of the present disclosure.

FIG. 8 is a flowchart 800 illustrating a method/process performed by a UE for MsgA transmission in a two-step RA procedure, according to an example implementation of the present disclosure. In action 802, the UE may receive, from a BS, a PRACH configuration, the PRACH configuration including one or more sets of PRACH preambles, each set of PRACH preambles being associated with a feature or a feature combination. For example, as illustrated in FIG. 2 and FIG. 5, each of the preamble sets may be associated with a feature or a feature combination. A feature associated with a set of PRACH preambles may include {RedCap, SDT, slicing, 2-step, group B}, and a feature combination may be any combination thereof.

In action 804, the UE may receive, from the BS, a first MsgA PUSCH configuration associated with the PRACH configuration. For example, the first MsgA PUSCH configuration may be msgA-PUSCH-Config. In action 806, the UE receives, from the BS, a second MsgA PUSCH configuration associated with a specific set of PRACH preambles in the one or more sets of PRACH preambles. The second MsgA PUSCH configuration may be separate from the first MsgA PUSCH configuration and may be associated with a specific set of PRACH preambles. For example, as illustrated in FIG. 5, preamble set #8 may not have available PUSCH resources for mapping. By introducing the second MsgA PUSCH configuration associated with preamble set #8, now preamble set #8 may have available PUSCH resources for mapping, which is configured by the second MsgA PUSCH configuration.

In action 808, the UE may determine a first PRACH preamble from at least one of the one or more sets of PRACH preambles, the first PRACH preamble being associated with a specific feature or a specific feature combination. For example, the UE may first determine {SDT} and then determine a PRACH preamble associated with the feature {SDT}. In action 810, the UE may determine a MsgA PUSCH corresponding to the first PRACH preamble. The determination in action 810 may depend on whether the first PRACH preamble determined in action 808 is within the specific set of PRACH preambles associated with the second MsgA PUSCH configuration.

In action 812, the UE may transmit, to the BS, the first PRACH preamble and the MsgA PUSCH. The MsgA PUSCH is determined according to the first PRACH preamble and the first MsgA PUSCH configuration in a case that the first PRACH preamble is not within the specific set of PRACH preambles. The MsgA PUSCH is determined according to the first PRACH preamble and the second MsgA PUSCH configuration in a case that the first PRACH preamble is within the specific set of PRACH preambles.

In some implementations, the MsgA PUSCH is included in one or more MsgA PUSCH resources mapped to one or more PRACH preambles including the first PRACH preamble. As illustrated in FIG. 5, the one or more PRACH preambles may correspond to a preamble set (e.g., preamble set #1, preamble set #2, etc.). Each preamble set is mapped to one or more MsgA PUSCH resources. Each of the one or more MsgA PUSCH resources includes a PUSCH occasion and a DMRS resource associated with the PUSCH occasion. The PUSCH occasion is configured by the first MsgA PUSCH configuration or the second MsgA PUSCH configuration depending on whether the first PRACH preamble is within the specific set of PRACH preambles. For example, the PUSCH occasion is configured by the first MsgA PUSCH configuration in a case that the first PRACH preamble is not within the specific set of PRACH preambles. The PUSCH occasion is configured by the second MsgA PUSCH configuration in a case that the first PRACH preamble is within the specific set of PRACH preambles.

In some implementations, the DMRS resource includes a DMRS port and a DMRS sequence configured by the first MsgA PUSCH configuration or the second MsgA PUSCH configuration depending on whether the first PRACH preamble is within the specific set of PRACH preambles. For example, the DMRS resource is configured by the first MsgA PUSCH configuration in a case that the first PRACH preamble is not within the specific set of PRACH preambles. The DMRS resource is configured by the second MsgA PUSCH configuration in a case that the first PRACH preamble is within the specific set of PRACH preambles.

In some implementations, a number of PRACH preambles in the one or more PRACH preambles (e.g., $N_{preamble}$ illustrated in FIG. 2 and FIG. 5) is equal to a number of PRACH preambles in one or more PRACH occasions in an association pattern period (e.g., $T_{preamble}$) divided by a number of MsgA PUSCH resources associated with the one or more PRACH occasions in the association pattern period (e.g., $T_{PUSCH}$). For example, $T_{preamble}$ is a total number of valid PRACH occasions per association pattern period multiplied by the number of preambles per valid PRACH occasion provided by rach-ConfigCommonTwoStepRA. $T_{PUSCH}$ is a total number of valid PUSCH occasions per PUSCH configuration per association pattern period multiplied by the number of DMRS resource indexes per valid PUSCH occasion provided by msgA-DMRS-Config.

In some implementations, each of the one or more PRACH occasions is associated with one or more MsgA PUSCH occasions determined by a time domain offset (e.g., msgA-PUSCH-TimeDomainOffset), a number of slots (e.g., nrofSlotsMsgA-PUSCH), and a number of PUSCH occasions within a slot (e.g., nrofMsgA-PO-perSlot).

In some implementations, the first PRACH preamble is transmitted in a first PRACH occasion indicated by a PRACH mask index associated with the specific feature or the specific feature combination.

Figure 9:
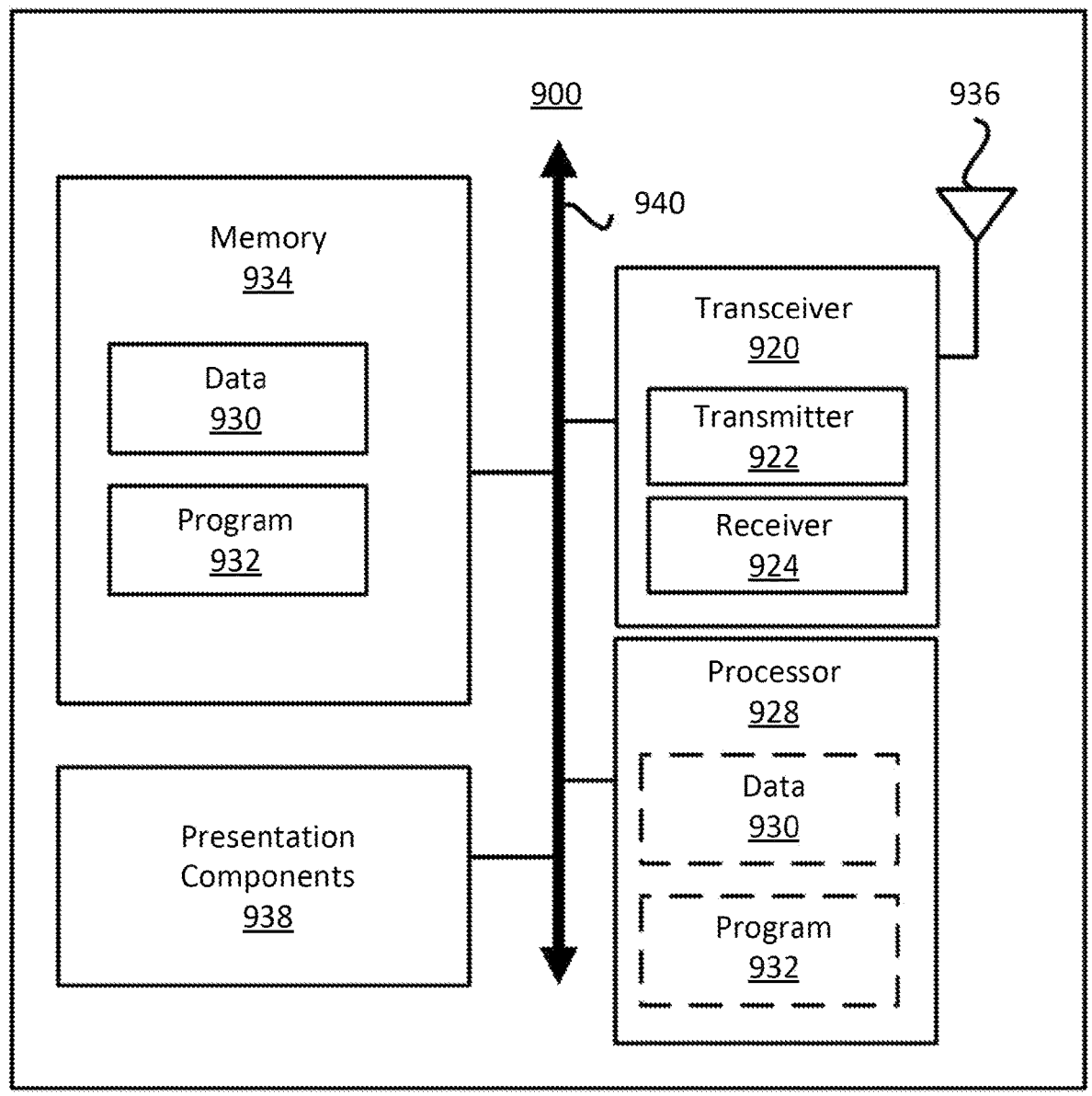
FIG. 9 is a block diagram illustrating a node for wireless communication in accordance with various aspects of the present disclosure.

FIG. 9 is a block diagram illustrating a node 900 for wireless communication in accordance with various aspects of the present disclosure. As illustrated in FIG. 9, a node 900 may include a transceiver 920, a processor 928, a memory 934, one or more presentation components 938, and at least one antenna 936. The node 900 may also include a radio frequency (RF) spectrum band module, a BS communications module, a network communications module, and a system communications management module, Input/Output (I/O) ports, I/O components, and a power supply (not illustrated in FIG. 9).

Each of the components may directly or indirectly communicate with each other over one or more buses 940. The node 900 may be a UE or a BS that performs various functions disclosed with reference to FIGS. 1 through 8.

The transceiver 920 has a transmitter 922 (e.g., transmitting/transmission circuitry) and a receiver 924 (e.g., receiving/reception circuitry) and may be configured to transmit and/or receive time and/or frequency resource partitioning information. The transceiver 920 may be configured to transmit in different types of subframes and slots including, but not limited to, usable, non-usable, and flexibly usable subframes and slot formats. The transceiver 920 may be configured to receive data and control channels.

The node 900 may include a variety of computer-readable media. Computer-readable media may be any available media that may be accessed by the node 900 and include volatile (and/or non-volatile) media and removable (and/or non-removable) media.

The computer-readable media may include computer-storage media and communication media. Computer-storage media may include both volatile (and/or non-volatile media), and removable (and/or non-removable) media implemented in any method or technology for storage of information such as computer-readable instructions, data structures, program modules, or data.

Computer-storage media may include RAM, ROM, EPROM, EEPROM, flash memory (or other memory technology), CD-ROM, Digital Versatile Disks (DVD) (or other optical disk storage), magnetic cassettes, magnetic tape, magnetic disk storage (or other magnetic storage devices), etc. Computer-storage media may not include a propagated data signal. Communication media may typically embody computer-readable instructions, data structures, program modules, or other data in a modulated data signal, such as a carrier wave, or other transport mechanisms and include any information delivery media.

The term "modulated data signal" may mean a signal that has one or more of its characteristics set or changed in such a manner as to encode information in the signal. Communication media may include wired media, such as a wired network or direct-wired connection, and wireless media, such as acoustic, RF, infrared, and other wireless media. Combinations of any of the previously listed components should also be included within the scope of computer-readable media.

The memory 934 may include computer-storage media in the form of volatile and/or non-volatile memory. The memory 934 may be removable, non-removable, or a combination thereof. Example memory may include solid-state memory, hard drives, optical-disc drives, etc. As illustrated in FIG. 9, the memory 934 may store a computer-readable and/or computer-executable program 932 (e.g., software codes) that are configured to, when executed, cause the processor 928 to perform various functions disclosed herein, for example, with reference to FIGS. 1 through 8. Alternatively, the program 932 may not be directly executable by the processor 928 but may be configured to cause the node 900 (e.g., when compiled and executed) to perform various functions disclosed herein.

The processor 928 (e.g., having processing circuitry) may include an intelligent hardware device, e.g., a Central Processing Unit (CPU), a microcontroller, an ASIC, etc. The processor 928 may include memory. The processor 928 may process the data 930 and the program 932 received from the memory 934, and information transmitted and received via the transceiver 920, the baseband communications module, and/or the network communications module. The processor 928 may also process information to send to the transceiver 920 for transmission via the antenna 936 to the network communications module for transmission to a CN.

One or more presentation components 938 may present data indications to a person or another device. Examples of presentation components 938 may include a display device, a speaker, a printing component, a vibrating component, etc.

In view of the present disclosure, it is obvious that various techniques may be used for implementing the disclosed concepts without departing from the scope of those concepts. Moreover, while the concepts have been disclosed with specific reference to certain implementations, a person of ordinary skill in the art may recognize that changes may be made in form and detail without departing from the scope of those concepts. As such, the disclosed implementations are to be considered in all respects as illustrative and not restrictive. It should also be understood that the present disclosure is not limited to the particular implementations disclosed and many rearrangements, modifications, and substitutions are possible without departing from the scope of the present disclosure.

What is claimed is:

1. A method performed by a user equipment (UE) for Message A (MsgA) transmission in a two-step Random Access (RA) procedure, the method comprising:
   receiving, from a base station (BS), a Physical Random Access Channel (PRACH) configuration, the PRACH configuration including one or more sets of PRACH preambles, each set of PRACH preambles being associated with a feature or a feature combination;
   receiving, from the BS, a first MsgA Physical Uplink Shared Channel (PUSCH) configuration associated with the PRACH configuration;
   receiving, from the BS, a second MsgA PUSCH configuration associated with a specific set of PRACH preambles in the one or more sets of PRACH preambles;
   determining a first PRACH preamble from at least one of the one or more sets of PRACH preambles, the first PRACH preamble being associated with a specific feature or a specific feature combination;
   determining a MsgA PUSCH corresponding to the first PRACH preamble; and
   transmitting, to the BS, the first PRACH preamble and the MsgA PUSCH;
   wherein:
   the MsgA PUSCH is determined according to the first PRACH preamble and the first MsgA PUSCH configuration in a case that the first PRACH preamble is not within the specific set of PRACH preambles, and
   the MsgA PUSCH is determined according to the first PRACH preamble and the second MsgA PUSCH configuration in a case that the first PRACH preamble is within the specific set of PRACH preambles.

2. The method of claim 1, wherein:
   the MsgA PUSCH is included in one or more MsgA PUSCH resources mapped to one or more PRACH preambles including the first PRACH preamble,
   each of the one or more MsgA PUSCH resources includes a PUSCH occasion and a Demodulation Reference Signal (DMRS) resource associated with the PUSCH occasion, and
   the PUSCH occasion is configured by the first MsgA PUSCH configuration or the second MsgA PUSCH configuration depending on whether the first PRACH preamble is within the specific set of PRACH preambles.

3. The method of claim 2, wherein the DMRS resource includes a DMRS port and a DMRS sequence configured by the first MsgA PUSCH configuration or the second MsgA PUSCH configuration depending on whether the first PRACH preamble is within the specific set of PRACH preambles.

4. The method of claim 2, wherein a number of PRACH preambles in the one or more PRACH preambles is equal to a number of PRACH preambles in one or more PRACH occasions in an association pattern period divided by a number of MsgA PUSCH resources associated with the one or more PRACH occasions in the association pattern period.

5. The method of claim 4, wherein each of the one or more PRACH occasions is associated with one or more MsgA PUSCH occasions determined by a time domain offset, a number of slots, and a number of PUSCH occasions within a slot.

6. The method of claim 1, wherein the first PRACH preamble is transmitted in a first PRACH occasion indicated by a PRACH mask index associated with the specific feature or the specific feature combination.

7. A user equipment (UE) for performing Message A (MsgA) transmission in a two-step Random Access (RA) procedure, the UE comprising:
   one or more processors; and
   at least one memory coupled to at least one of the one or more processors, the at least one memory storing computer-executable instructions that, when executed by the at least one of the one or more processors, cause the UE to:
   receive, from a base station (BS), a Physical Random Access Channel (PRACH) configuration, the PRACH configuration including one or more sets of PRACH preambles, each set of PRACH preambles being associated with a feature or a feature combination;
   receive, from the BS, a first MsgA Physical Uplink Shared Channel (PUSCH) configuration associated with the PRACH configuration;
   receive, from the BS, a second MsgA PUSCH configuration associated with a specific set of PRACH preambles in the one or more sets of PRACH preambles;
   determine a first PRACH preamble from at least one of the one or more sets of PRACH preambles, the first PRACH preamble being associated with a specific feature or a specific feature combination;
   determine a MsgA PUSCH corresponding to the first PRACH preamble; and
   transmit, to the B S, the first PRACH preamble and the MsgA PUSCH;
   wherein:
   the MsgA PUSCH is determined according to the first PRACH preamble and the first MsgA PUSCH configuration in a case that the first PRACH preamble is not within the specific set of PRACH preambles, and
   the MsgA PUSCH is determined according to the first PRACH preamble and the second MsgA PUSCH configuration in a case that the first PRACH preamble is within the specific set of PRACH preambles.

8. The UE of claim 7, wherein:
   the MsgA PUSCH is included in one or more MsgA PUSCH resources mapped to one or more PRACH preambles including the first PRACH preamble, each of the one or more MsgA PUSCH resources includes a PUSCH occasion and a Demodulation Reference Signal (DMRS) resource associated with the PUSCH occasion, and the PUSCH occasion is configured by the first MsgA PUSCH configuration or the second MsgA PUSCH configuration depending on whether the first PRACH preamble is within the specific set of PRACH preambles.

9. The UE of claim 8, wherein the DMRS resource includes a DMRS port and a DMRS sequence configured by the first MsgA PUSCH configuration or the second MsgA PUSCH configuration depending on whether the first PRACH preamble is within the specific set of PRACH preambles.

10. The UE of claim 8, wherein a number of PRACH preambles in the one or more PRACH preambles is equal to a number of PRACH preambles in one or more PRACH occasions in an association pattern period divided by a number of MsgA PUSCH resources associated with the one or more PRACH occasions in the association pattern period.

11. The UE of claim 10, wherein each of the one or more PRACH occasions is associated with one or more MsgA PUSCH occasions determined by a time domain offset, a number of slots, and a number of PUSCH occasions within a slot.

12. The UE of claim 7, wherein the first PRACH preamble is transmitted in a first PRACH occasion indicated by a PRACH mask index associated with the specific feature or the specific feature combination.

* * * * *